United States Patent
Nagumo et al.

(10) Patent No.: US 6,608,935 B2
(45) Date of Patent: *Aug. 19, 2003

(54) PICTURE ENCODING METHOD AND APPARATUS, PICTURE DECODING METHOD AND APPARATUS AND FURNISHING MEDIUM

(75) Inventors: Takefumi Nagumo, Tokyo (JP); Teruhiko Suzuki, Chiba (JP); Yoichi Yagasaki, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,690

(22) Filed: Jun. 24, 1999

(65) Prior Publication Data
US 2003/0108099 A1 Jun. 12, 2003

(30) Foreign Application Priority Data

Jun. 26, 1998 (JP) .............................. 10-181269

(51) Int. Cl.⁷ .................................. G06K 9/46
(52) U.S. Cl. ................. 382/233; 382/166; 382/250; 375/240.2
(58) Field of Search ................. 382/173, 251, 382/232, 236, 194, 243, 233, 180, 248, 250, 238, 239, 240, 166, 164, 165, 167, 163, 162; 375/240.18, 240.16, 240.23, 240.27, 240.12, 240.2, 240.24

(56) References Cited

U.S. PATENT DOCUMENTS

| | | | |
|---|---|---|---|
| 5,122,875 A | 6/1992 | Raychaudhuri et al. | 358/133 |
| 5,896,176 A | 4/1999 | Das et al. | 348/416 |
| 5,933,538 A * | 8/1999 | Fukuda et al. | 382/251 |
| 5,995,668 A | 11/1999 | Corset et al. | 382/233 |

* cited by examiner

Primary Examiner—Bhavesh M. Mehta
Assistant Examiner—Seyed Azarian
(74) Attorney, Agent, or Firm—Frommer Lawrence & Haug LLP; William S. Frommer; Hans R. Mahr

(57) ABSTRACT

The MPEG4 is expanded to permit the use of the 4:2:2 format and the 4:4:4 format. To this end, there is provided an encoder adapted for encoding a picture in terms of a macro-block made up of a block of luminance Y and a block of chrominance Cr, Cb. The encoder includes a VOP encoding unit 3 for encoding the picture as reading of a flag (cbpc) specifying the state of encoding of the chrominance block and a flag (cbpcb, cbpcr) specifying the state of encoding of the chrominance block associated with the types of the chrominance Cb, Cr is adaptively changed responsive to a flag (chroma_type) representing the chrominance format of the picture and to the flag (cbpc) specifying the state of encoding of the chrominance block.

16 Claims, 36 Drawing Sheets

× LUMINANCE Y

⊘ CHROMA Cr, Cb

4 : 2 : 0 Macroblock structure

4 : 2 : 2 Macroblock structure

4 : 4 : 4 Macroblock structure

4 : 2 : 0

4 : 2 : 2

4 : 4 : 4      ○ LUMINANCE PIXELS

× CHROMA PIXELS

```
for (x=0;x<N;x++) {
    if(s[y][x]==1) {hor_pad[y][x]=d[y][x];s'[y][x]=1;}
    else{
        if(s[y][x']==1&&s[y][x"]==1)
            hor_pad[y][x]=(d[y][x']+d[y][x"])//2;
            s'[y][x]=1;
        } else if(s[y][x']==1) {
            hor_pad[y][x]=d[y][x'];s'[y][x]=1;
        } else if(s[y][x"]==1) {
            hor_pad[y][x]=d[y][x"];s'[y][x]=1;
        }
    }
}
```

FIG.13

```
for (y=0;x<M;x++) {
    if(s'[y][x]==1)
        hv_pad[y][x]=hor_pad[y][x];
    else {
        if(s'[y'][x]==1&&s'[y"][x]==1)
        hv_pad[y][x]    =    (hor_pad[y'][x]    +
hor_pad[y"][x])//2;
        else if(s'[y'][x]==1)
            hv_pad[y][x]=hor_pad[y'][x];
        else if(s'[y"][x]==1)
            hv_pad[y][x]=hor_pad[y"][x];
    }
}
```

LUMINANCE AND 4 : 4 : 4 CHROMA BLOCK

4 : 2 : 2 CHROMA BLOCK

4 : 2 : 0 CHROMA BLOCK

Video Object Layer

| Video ObjectLayer() { | No.of bits | Mnemonic |
|---|---|---|
| if(nextbits()=video_object_layer_start_code) { | | |
| short_video_header=0 | | |
| video_object_layer_start_code | 32 | bslbf |
| is_object_layer_identifier | 1 | uimsbf |
| if(is_object_layer_identifier) { | | |
| video_object_layer_verid | 4 | uimsbf |
| video_object_layer_priority | 3 | uimsbf |
| } | | |
| vol_control_parameters | 1 | bslbf |
| if(vol_control_parameters) | | |
| aspect_ratio_into | 4 | uimsbf |
| VOP_rate_code | 4 | uimsbf |
| bit_rate | 30 | uimsbf |
| vbv_buffer_size | 18 | uimsbf |
| low_delay | 1 | uimsbf |
| } | | |
| chroma_formal | 2 | * |
| video_object_layer_shops | 2 | uimsbf |
| VOP_time_increment_resolution | 15 | uimsbf |
| fixed_VOP_role | 1 | bslbf |
| if(video_object_layer_shapel="binary only") { | | |
| if(video_object_layer_shape="rectangular") { | | |
| marker_bit | 1 | bslbf |
| video_object_layer_width | 13 | uimsbf |
| marker_bit | 1 | bslbf |
| video_object_layer_height | 13 | uimsbf |
| } | | |
| obmc_disable | 1 | bslbf |
| sprite_enable | 1 | bslbf |
| if(sprite_enable) { | | |
| sprite_width | 13 | uimsbf |
| marker_bit | 1 | bslbf |
| sprite_height | 13 | uimsbf |
| marker_bit | 1 | bslbf |
| sprite_left_coordinate | 13 | simsbf |
| marker_bit | 1 | bslbf |
| sprite_lop_coordinate | 13 | simsbf |
| marker_bit | 1 | bslbf |
| no_of_sprite_warping_points | 6 | uimsbf |
| sprite_warping_accuracy | 2 | uimsbf |

FIG.25

Meaning of chroma_format

| chrom_format | Meaning |
|---|---|
| 00 | reserved |
| 01 | 4:2:0 |
| 10 | 4:2:2 |
| 11 | 4:4:4 |

FIG.26

| macroblock(){ | No.of bits | Mnemonic | |
|---|---|---|---|
| if(VOP_coding_type!="B") { | | | |
|   if(video_object_layer_shape!="rectangular"<br>    &&!(sprite_enable && low_latency_sprite_enable<br>    && sprite_transmit_mode="update")) | | | |
|     mb_binary_shape_coding() | | | |
|   if(video_object_layer_shape!="binary only") { | | | |
|     if(transparent_mb()) { | | | |
|       if(VOP_coding_type!="I"&&!(sprite_enable<br>        && sprite_transmit_mode="place")) | | | |
|         not_codeb | 1 | bslbf | |
|     if(!not_coded I VOP_coding_type="I") { | | | |
|       mcbpc | 1-9 | vlclbf | * |
|       if(cbpc="10" I cbpc="11") | | | * |
|         if(chroma_format="10") | | | * |
|           cbpcb | 1-2 | vlcbf | * |
|         if(chroma_format="11") | | | * |
|           cdpcb | 1-4 | vlcbf | * |
|       if(cdpc="01" I cdpc="11") | | | * |
|         if(chroma_format="10") | | | * |
|           cbpcr | 1-2 | vlcbf | * |
|         if(chroma_format="11") | | | * |
|           cbpcr | 1-4 | vlcbf | * |
|       if((!short_video_header &&<br>        derived_mb_type!=3 I<br>        derived_mb_type!=4)) | | | |
|         oc_pred_flag | 1 | bslbf | |
|       if(derived_mb_type!="stuffing") | | | |
|         cbpy | 1-6 | vlclbf | |
|       else | | | |
|         return() | | | |
|       if(derived_mb_type=1 I<br>        derived_mb_type!=4) | | | |
|         dquant | 2 | uimsbf | |
|       if(interlaced) | | | |
|         interlaced_information() | | | |
|       if(!(ref_select_code!='11' && scalability)<br>        && VOP_coding_type!="5") { | | | |
|         if(derived_mb_type=0||<br>          derived_mb_type=1) { | | | |
|           motion_vector("forward") | | | |
|         if(field_prediction) | | | |
|           motion_vector("forward") | | | |

FIG.27

| | | |
|---|---|---|
| } | | |
|   if(derived_mb_type=2) { | | |
|     for(j=0;j<4;j++) | | |
|       if(!transparent_block(j)) | | |
|         motion_vector("forward")) | | |
|   } | | |
| } | | |
|   for(i=0;i<block_count;i++) | | |
|     block(i) | | |
|   } | | |
| } | | |
| } | | |
| } | | |
| else if(co_located_not_coded!=1 I (ref_select_code='11' I enhancement_type=1)&& scalability)) { | | |
|   if(video_object_layer_shape!="rectangular") | | |
|   mb_binary_shape_coding() | | |
|   if(video_object_layer_shape!="binary only") { | | |
|     if(transparent_mb()) { | | |
|       modb | 1-2 | vlclbf |
|     if(modb) { | | |
|       if(modb>0) | | |
|         mb_type | 1-4 | vlclbf |
|       if(modb=2) | | |
|         cbpb | 3-6 | uimsbf | *
|       if(cbpc="10" I cbpc="11") | | | *
|         if(chroma_format="10") | | | *
|           cbpcb | 1-2 | vlcbf | *
|         if(chroma_format="11") | | | *
|           cbpcb | 1-4 | vlcbf | *
|       if(cbpc="10" I cbpc="11") | | | *
|         if(chroma_format="10") | | | *
|           cbpcr | 1-2 | vlcbf | *
|         if(chroma_format="11") | | | *
|           cbpcr | 1-2 | vlcbf | *
|       if(ref_select_code!='00' I !scalability) { | | |
|         if(mb_type!="1"&& cbpb!=0) | | |
|           dquant | 2 | uimsbf |
|         if(field_prediction) | | |
|           interlaced_information() | | |
|         if(mb_type='01' I mb_type='0001') { | | |
|           motion_vector("forward") | | |

FIG.28

| Code | mbtype | cdpc (Cb, Cr) |
|---|---|---|
| 1 | 3 | 00 |
| 001 | 3 | 01 |
| 010 | 3 | 10 |
| 011 | 3 | 11 |
| 0001 | 4 | 00 |
| 0000 01 | 4 | 01 |
| 0000 10 | 4 | 10 |
| 0000 11 | 4 | 11 |
| 0000 0000 1 | Stuffing | — |

FIG.29

| Code | mbtype | cdpc (Cb, Cr) |
|---|---|---|
| 1 | 0 | 00 |
| 0011 | 0 | 01 |
| 0010 | 0 | 10 |
| 0001 01 | 0 | 11 |
| 011 | 1 | 00 |
| 0000 111 | 1 | 01 |
| 0000 110 | 1 | 10 |
| 0000 0010 1 | 1 | 11 |
| 010 | 2 | 00 |
| 0000 101 | 2 | 01 |
| 0000 100 | 2 | 10 |
| 0000 0101 | 2 | 11 |
| 0001 1 | 3 | 00 |
| 0000 0100 | 3 | 01 |
| 0000 0011 | 3 | 10 |
| 0000 011 | 3 | 11 |
| 0001 00 | 4 | 00 |
| 0000 0010 0 | 4 | 01 |
| 0000 0001 1 | 4 | 10 |
| 0000 0001 0 | 4 | 11 |
| 0000 0000 1 | Stuffing | — |

FIG.30

| VOP type | mbtype | Name | not_coded | mcbc | cbpy | dquant | mvd | mvd2-4 |
|---|---|---|---|---|---|---|---|---|
| P | not coded | — | 1 | | | | | |
| P | 0 | inter | | 1 | 1 | | 1 | |
| P | 1 | inter+q | | 1 | 1 | 1 | 1 | |
| P | 2 | inter4v | | 1 | 1 | | 1 | 1 |
| P | 3 | intra | | 1 | 1 | | | |
| P | 4 | intra+q | | 1 | 1 | 1 | | |
| — | stuffing | — | | | | | | |
| — | 3 | intra | | 1 | 1 | | | |
| — | 4 | intra+q | | 1 | 1 | 1 | | |
| S(update) | stuffing | — | | | | | | |
| S(update) | not_coded | — | 1 | | | | | |
| S(update) | 0 | inter | | 1 | 1 | | | |
| S(update) | 1 | inter+q | | 1 | 1 | 1 | | |
| S(update) | 3 | intra | | 1 | 1 | | | |
| S(update) | 4 | intra+q | | 1 | 1 | 1 | | |
| S(update) | stuffing | — | | | | | | |
| S(piece) | 3 | intra | | 1 | 1 | | | |
| S(piece) | 4 | intra+q | | 1 | 1 | 1 | | |
| S(piece) | stuffing | — | | | | | | |

FIG. 31

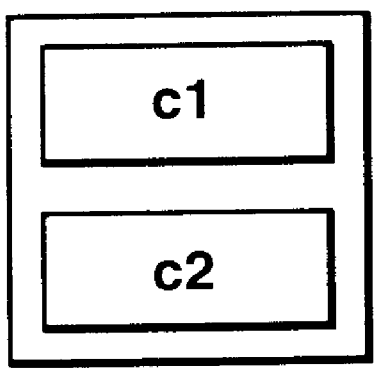 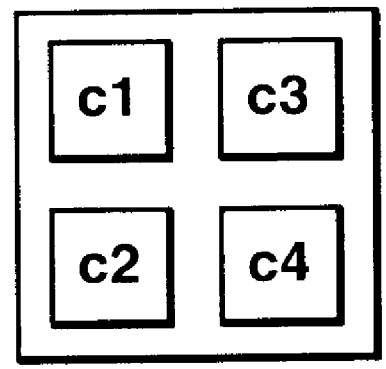
4 : 2 : 2        4 : 4 : 4
FIG.34

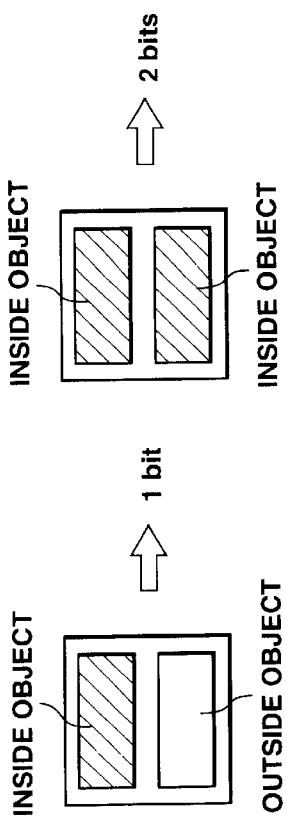
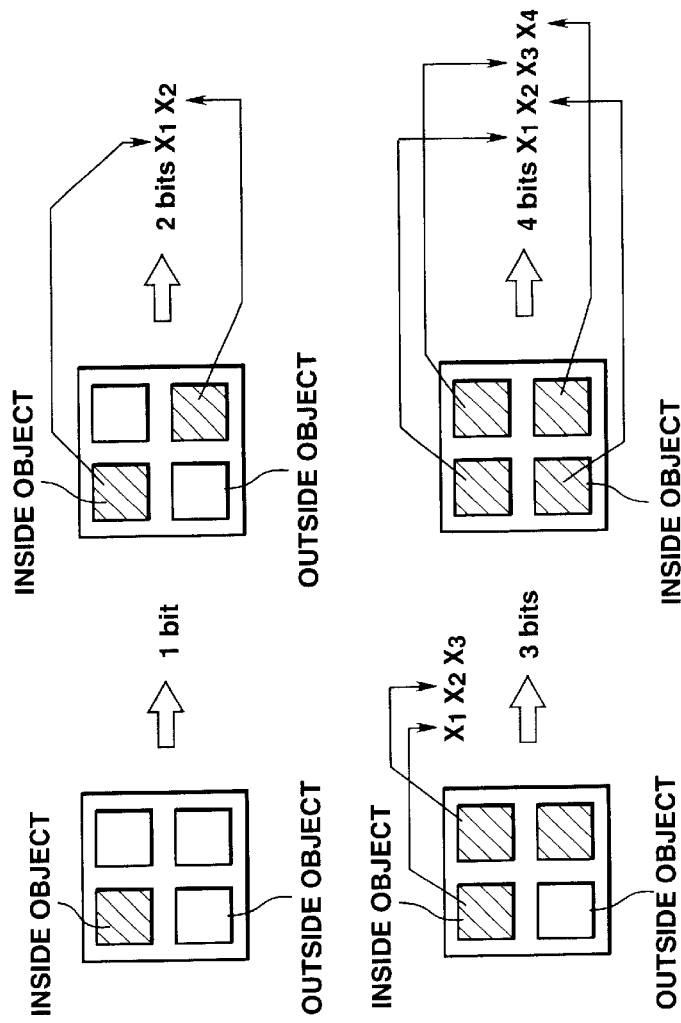
FIG.35A
FIG.35B block_count as a function of chroma_format

| chrom_format | block_count |
|---|---|
| 4:2:0 | 6 |
| 4:2:2 | 8 |
| 4:4:4 | 12 |

FIG.36

Macroblock

| macroblock(){ | No.of bits | Mnemonic | |
|---|---|---|---|
| if(VOP_coding_type!="B") { | | | |
|   if(video_object_layer_shape!="rectangular"<br>   &&!(sprite_enable && low_latency_sprite_enable<br>   && sprite_transmit_mode="update")) | | | |
|     mb_binary_shape_coding() | | | |
|   if(video_object_layer_shape!="binary only") { | | | |
|     if(transparent_mb()) { | | | |
|       if(VOP_coding_type!="T"&&!(sprite_enable<br>       && sprite_transmit_mode="place")) | | | |
|         not_codeb | 1 | bslbf | |
|       if(!not_coded I VOP_coding_type="T") { | | | |
|         mcbpc | 1-9 | vlclbf | * |
|         if(cbpc="10" I cbpc="11") | | | * |
|           if(chroma_format="10") | | | * |
|             cbpcb | 1-2 | vlcbf | * |
|           if(chroma_format="11") | | | * |
|             cbpcb | 1-4 | vlcbf | * |
|         if(cbpc="01" I cbpc="11") | | | * |
|           if(chroma_format="10") | | | * |
|             cbpcr | 1-2 | vlcbf | * |
|           if(chroma_format="11") | | | * |
|             cbpcr | 1-4 | vlcbf | * |
|         if((!short_video_header &&<br>          derived_mb_type!=3 I<br>            derived_mb_type!=4)) | | | |
|           oc_pred_flag | 1 | bslbf | |
|         if(derived_mb_type!="stuffing") | | | |
|           cbpy | 1-6 | vlclbf | |
|         else | | | |
|           return() | | | |
|         if(derived_mb_type=1 I<br>          derived_mb_type!=4) | | | |
|           dquant | 2 | uimsbf | |
|         if(interlaced) | | | |
|           interlaced_information() | | | |
|         if(!(ref_select_code!='11' && scalability)<br>          && VOP_coding_type!="5") { | | | |
|           if(derived_mb_type=0 I<br>            derived_mb_type=1) { | | | |
|             motion_vector("forward") | | | |
|             if(field_prediction) | | | |

FIG.37

| | | |
|---|---|---|
| motion_vector("forward") | | |
| } | | |
| if(derived_mb_type=2) { | | |
| for(j=0;j<4;j++) | | |
| if(!transparent_block(j)) | | |
| motion_vector("forward")) | | |
| } | | |
| } | | |
| for(i=0;i<block_count;i++) | | |
| block(i) | | |
| } | | |
| } | | |
| } | | |
| } | | |
| else if(co_located_not_coded!=1 I (ref_select_code='11' I enhancement_type=1)&& scalability)) { | | |
| if(video_object_layer_shape!="rectangular") | | |
| mb_binary_shape_coding() | | |
| if(video_object_layer_shape!="binary only") { | | |
| if(transparent_mb()) { | | |
| modb | 1-2 | vlclbf |
| if(modb) { | | |
| if(modb>0) | | |
| mb_type | 1-4 | vlclbf |
| if(modb=2) | | |
| cbpb | 3-12 | uimsbf * |
| if(ref_select_code!='00' I !scalability) { | | |
| if(mb_type!="1"&& cbpb!=0) | | |
| dquant | 2 | uimsbf |
| if(field_prediction) | | |
| interlaced_information() | | |
| if(mb_type='01' I mb_type='0001') { | | |
| motion_vector("forward") | | |
| if(interlaced) | | |
| motion_vector("forward") | | |
| } | | |
| if(mb_type='01' I mb_type='001') { | | |
| motion_vector("backward") | | |
| if(field_prediction) | | |
| motion_vector("backward") | | |
| } | | |
| if(mb_type="1") | | |

FIG.38

```
for (i=0;i<12;i++) {
    if(macroblock_intra)
        pattern_code[i]=1;
    else
        pattern_code[i]=0;
}
if(macroblock_pattern) {
    for (i=0;i<6;i++)
        if(cbp & (1<<(5-i)) )pattern_code[i]=1;
    if (chroma_format=="4;2;2")
        for(i=6;i<8;i++)
            if(coded_block_pattern_1 & (1<<(7-i)) )pattern_code[i]=1;
    if (chroma_format=="4;4;4")
        for(i=8;i<12;i++)
            if(coded_block_pattern_2 & (1<<(11-i)) )pattern_code[i]=1;
}
```

FIG.39

PICTURE ENCODING METHOD AND APPARATUS, PICTURE DECODING METHOD AND APPARATUS AND FURNISHING MEDIUM

BACKGROUND OF THE INVENTION

1. Field of the Invention

This invention relates to a picture encoding method and apparatus, a picture decoding method and apparatus and a furnishing medium. More particularly, it relates to a picture encoding method and apparatus, a picture decoding method and apparatus and a furnishing medium which may be used for picture encoding for recording moving picture data on a recording medium, such as a magneto-optical disc or a magnetic tape, reproducing and displaying the data on a display, and which may be used for transmitting the moving picture data via a transmission route from a transmitting side to a receiving side over a transmission route as in the case of the teleconferencing system, television telephone system, broadcast equipment, or a multimedia database retrieval system, in order for the receiving side to display the received moving picture data, edit and record the received data.

2. Description of the Related Art

In a system for transmitting moving picture data to a remote site, such as the teleconferencing system or a television telephone system, line correlation or frame-to-frame picture correlation is utilized for efficiently exploiting the television receiver in order to effect compression encoding of picture data.

Typical of the high efficiency encoding system for moving pictures is the Moving Picture Experts Group (MPEG) system. This has been discussed in the ISO-IEC/JTC1/SC2/WG11 and proposed as a standard draft. This MPEG system employs a hybrid system which is the combination of the motion compensation predictive encoding and discrete cosine transform (DCT) encoding.

In the MPEG system, several profiles and levels are defined for coping with various applications and functions. Most basic is the main profile level (MP@ML: Main Profile at Main Level).

FIG. 1 shows an illustrative structure of a MP@ML encoder in the MPEG system.

The input picture data to be encoded are inputted to and temporarily stored in a frame memory 31.

A motion vector detector 32 reads out the picture data stored in the frame memory 31 in terms of a macro-block made up of, for example, 16×16 pixels, as a unit, to detect its motion vector.

The motion vector detector 32 processes picture data of respective frames as an intra-frame picture (I-picture), a predictive-coded picture (P-picture) or as a bidirectional-coded picture (B-picture). It is predetermined by which one of the I-, P- and B-pictures the pictures of sequentially inputted frames is to be processed. For example, these pictures are processed in a sequence of I, B, P, B, P, . . . B, P.

That is, the motion vector detector 32 refers to a predetermined pre-set reference frame in the picture data stored in the frame memory 31 and effects pattern matching (block matching) between the reference frame and a small block (macro-block) of 16 pixels by 16 lines of a frame being encoded to detect the motion vector of the macro-block.

In the MPEG system, there are four picture prediction modes, namely an intracoding (intra-frame coding), a forward prediction coding, a backward prediction coding and bidirectional prediction coding. An I-picture is encoded by intra-frame coding, while a P-picture is encoded by intra-frame coding or forward prediction coding, and a B-picture is encoded by intra-frame coding, forward prediction coding, backward prediction coding or by bidirectional prediction coding.

Therefore, the motion vector detector 32 sets the intra-frame coding as a prediction mode for an I-picture. In this case, the motion vector detector 32 outputs only the information on the prediction mode (herein the intra-frame prediction mode) to a variable length encoding (VLC) unit 36 and to a motion compensation unit 42, without detecting the motion vector.

The motion vector detector 32 makes forward prediction for the P-picture to detect its motion vector. The motion vector detector 32 compares a prediction error arising from forward prediction to, for example, the variance of the macro-block being encoded (herein a macro-block of a P-picture). If, as a result of comparison, the variance of the macro-block is larger than the prediction error, the motion vector detector 32 sets the intra-coding mode as the prediction mode and outputs the information on this mode along with the detected motion vector to the VLC unit 36 and to the motion compensation unit 42. If it is the prediction error arising from forward prediction that is smaller the motion vector detector 32 sets the forward prediction mode as the prediction mode to send the detected motion vector and the information on the mode to the VLC unit 36 and to the motion compensation unit 42.

The motion vector detector 32 also effects forward prediction, backward prediction and bidirectional prediction for a B-picture to detect respective motion vectors. The motion vector detector 32 detects the smallest one of prediction errors incurred in the forward prediction, backward prediction and bidirectional prediction. This detected error is referred to below as the smallest prediction error. The motion vector detector 32 then compares this smallest prediction error to, for example, the variance of the macro-block being encoded (macro-block of the B-picture). If, as the result of comparison, the variance of the macro-block is smaller than the smallest prediction error, the motion vector detector 32 sets the intra-coding mode as the prediction mode and outputs the information on the mode along with the detected motion vector to the VLC unit 36 and to the motion compensation unit 42. If it is the smallest prediction error that is smaller, the motion vector detector 32 sets, as the prediction mode, that prediction mode for which the smallest prediction error has been obtained, and outputs the mode information along with the detected motion vector to the VLC unit 36 and to the motion compensation unit 42.

On reception of both the prediction mode and the motion vector from the motion vector detector 32, the motion compensation unit 42 reads out encoded and previously locally decoded picture data which is stored in the frame memory 41, in accordance with the prediction mode and the motion vector, to route the read-out picture data as prediction picture data to arithmetic units 33, 40.

The arithmetic unit 33 reads out from the frame memory 31 the same macro-block as the picture data read out from the frame memory 31 by the motion vector detector 32, and computes the difference between the macro-block and the prediction picture from the motion compensation 42. This difference value is sent to a DCT unit 34.

If the motion compensation unit 42 has received only the prediction mode from the motion vector detector 32, that is if the prediction mode is the intra-coding mode, the motion compensation unit 42 does not output a prediction picture. In this case, the arithmetic unit 33, 40 do not perform any particular processing and output the macro-block read out from the frame memory 31 directly to the DCT unit 34.

The DCT unit 34 performs DCT processing on the output data of the arithmetic unit 33 and routes:the resulting DCT coefficients to a quantizer 35. The quantizer 35 quantizes the DCT coefficients from the DCT unit 34 at a quantization step (quantization scale), which is set in the quantizer 35 in association with the data storage quantity in a buffer 37 (volume of data stored in the buffer 37) that is buffer feedback. The quantized DCT coefficients, sometimes referred to below as quantization coefficients, are routed to the VLC unit 36 along with the as-set quantization steps.

The VLC unit 36 converts the quantization coefficients routed from the quantizer 35 into, for example, a variable length code, such as Huffmann code, and outputs these codes to the buffer 37. The VLC unit 36 also variable length encodes the prediction mode (the mode indicating which of the intra-prediction, forward prediction, backward prediction or the bidirectional prediction has been set) and the motion vector from the motion vector detector 32 to output the resulting encoded data to the buffer 37.

The buffer 37 temporarily stores the encoded data from the VLC unit 36 to smooth the data volume to output the data as an encoded bitstream to, for example, a transmission route or to record the data on a recording medium.

The buffer 37 outputs the stored data volume to the quantizer 35 which then sets the quantization step in accordance with the volume of stored data from the buffer 37. That is, in case of impending overflow of the buffer 37, the quantizer 35 increases the quantization step to lower the volume of data of the quantization coefficients. In case of impending underflow of the buffer 37, the quantizer 35 decreases the quantization step to increase the volume of data of the quantization coefficients. This prohibits overflow or underflow of the buffer 37.

The quantization coefficients and the quantization step outputted by the quantizer 35 are routed not only to the VLC unit 36 but also to the dequantizer 38. The dequantizer 38 dequantizes the quantization coefficients from the quantizer 35 in accordance with the quantization step from the quantizer 35. This converts the quantization coefficients to DCT coefficients which are then routed to an inverse DCT (IDCT) unit 39. The IDCT unit 39 inverse discrete cosine transforms the DCT coefficients to route the resulting data to the arithmetic unit 40.

The arithmetic unit 40 is fed not only with the output data from the IDCT unit 39 but also with the same data as the prediction picture supplied from the motion compensation unit 42 to the arithmetic unit 33. The arithmetic unit 40 sums the output data of the IDCT unit 39 (prediction residuals or difference data) of the IDCT unit 39 to the prediction picture data from the motion compensation unit 42 to locally decode the original picture data to output the locally decoded picture data. However, if the prediction mode is the intra-coding, the output data of the IDCT unit 39 is passed through the arithmetic unit 40 so as to be directly routed as the locally decoded picture data to the frame memory 41. Meanwhile, this decoded picture data is the same as the decoded picture data obtained on the receiver.

The decoded picture data obtained by the arithmetic unit 40, that is the locally decoded picture data, is sent to and stored in the frame memory 41 so as to be used subsequently as reference picture data (reference frame) for a picture encoded by inter-coding (forward prediction, backward prediction or bidirectional prediction).

FIG. 2 shows an illustrative structure of a MP@ML decoder in the MPEG used for decoding the encoded data outputted by the encoder of FIG. 1.

In the decoder, a buffer 101 is fed with an encoded bitstream which is received by a receiver, not shown, over a television receiver, or which is reproduced by a reproducing device, not shown, from an encoded bitstream recorded on a recording medium. The buffer 101 transiently records this encoded bitstream.

An IVLC unit (variable-length decoding unit) 102 reads out the encoded data stored in the buffer 101 to variable-length decode the read-out data to separate the encoded data into a motion vector, prediction mode, quantization step and quantization coefficients on the macro-block basis. Of these data, the motion vector and the prediction mode are sent to the motion compensation unit 107, while the quantization coefficients of the macro-block and the quantization step are routed to a dequantizer 103.

The dequantizer 103 dequantizes the quantization coefficients of a macro-block supplied from an IVLC unit 102, in accordance with the quantization step similarly supplied by the IVLC unit 102, to output the resulting DCT coefficients to an IDCT unit 104. The IDCT unit 104 inverse discrete cosine transforms the DCT coefficients from the dequantizer 103 to route resulting data to the arithmetic unit 105.

The arithmetic unit 105 is fed not only with the output data of the IDCT unit 104, but also with output data of a motion compensation unit 107. That is, similarly to the motion compensation unit 42 of FIG. 1, the motion compensation unit 107 reads out the previously decoded picture data in accordance with the motion vector from the IVLC unit 102 and the prediction mode to route the read-out picture data to the arithmetic unit 105 as prediction picture data. The arithmetic unit 105 sums the output data of the IDCT unit 104 (prediction residuals (difference value)) to the prediction picture data from the motion compensation unit 107 to decode the original picture data. The decoded picture data is outputted as playback picture data, while being sent to and stored in the frame memory 106. If output data of the IDCT unit 104 is intracoded data, the output data is passed through the arithmetic unit 105 so as to be directly supplied to and stored in the frame memory 106.

The decoded picture data stored in the frame memory 106 is used as reference picture data for subsequently decoded picture data. The decoded picture data is routed to and displayed on, for example, a display, not shown, as a reproduced output picture.

Meanwhile, since B-pictures are not used as referecne picture data in the MPEG1 or 2, these B-pictures are not stored in the frame memory 41 (FIG. 1) nor in the frame memory 106 (FIG. 2) in the encoder or in the decoder.

The encoder or the decoder shown in FIGS. 1 and 2 are constructed in accordance with the standards of the MPEG1 or MPEG2. The operations of standardization as the MPEG 4 are now going on in connection with an encoding system on the video object basis in ISO-IEC/JTC1/SC29/EG11. The video object (VO) is a sequence of objects, such as object, making up a picture.

Meanwhile, the MPEG 4 provides that a picture format prescribed in FIG. 3, termed a 4:2:0 format, is the sole format for encoded/decoded pictures.

In this 4:2:0 format, lumninance signals Y and two chroma signals Cr, Cb, as shown in FIG. 3, are used.

The 4:2:0 format is such a picture format in which each if chrominance Cr, Cb is allocated for two scanning lines of the luminance Y and two horizontal pixels, that is in which one pixel each of the chrominance Cr, Cb is allocated to the four pixels of the luminance Y, with the positions of the chrominance Cr, Cb being the same as that of the luminance Y.

Meanwhile, the positions of the chrominance Cr, Cb with respect to the luminance Y differ not only with the positions of FIG. 3 but also with the device in use.

With the 4:2:0 format, since one pixel each of the chrominance Cr, Cb is allocated to the four pixels of luminance Y, the chrominance Cr, Cb are lowered in resolution than the luminance Y.

Therefore, the 4:2:2 format or the 4:4:4 format is used, in place of the 4:2:0 format, for pictures of high quality such as those required by the broadcast station, depending on the usage.

In the 4:2:2 format, one pixel each of the chrominance Cr, Cb is used for one horizontal scanning line of the luminance Y and one pixel in the horizontal direction (one Cr pixel and one Cb pixel for two pixels of the luminance Y), as shown in the pixel arraying diagram of FIG. 4.

In the 4:4:4 format, one pixel each of the chrominance Cr, Cb is used for one horizontal scanning line of the luminance Y and one pixel in the horizontal direction, as shown in the pixel arraying diagram of FIG. 5. That is, the luminance Y and the chrominance Cr, Cb have the same positions and the same number of pixels.

Thus, in the 4:2:2 format or in the 4:4:4 format, the number of pixels of the chrominance signals is larger than in the case of the 4:2:0 format, so that these 4:2:2 and 4:4:4 formats can be used with advbantage for a picture in need of high picture quality.

However, since the MPEG4 provides only the picture of the 4:2:0 format, such that it is impossible to use the 4:2:2 format or the 4:4:4 format for encoded or decoded pictures.

The MPEG4 also is formulated to encode not only a picture but also the shape information. Moreover, the method for encoding the shape information is associated only with the 4:2:0 format such that it is not associated with the 4:2:2 format nor with the 4:4:4 format.

SUMMARY OF THE INVENTION

It is therefore an object of the present invention to provide a picture encoding method and apparatus, a picture decoding method and apparatus and a furnishing medium whereby the MPEG4 is expanded such as to permit the use of the 4:2:2 format or the 4:4:4 format in the MPEG4.

In one aspect, the present invention provides a picture encoding method and apparatus in which reading of a flag indicating the encoding state of the chrominance block and a flag indicating the encoding state of the chrominance block associated with the chrominance type is adaptively changed responsive to a flag indicating the chrominance format adapted for setting the type and the number of chrominance pixels allocated to the luminance pixels constituting the luminance block and a flag indicating the state of the encoding of the chrominance block.

In another aspect, the present invention provides a pro- vides a picture encoding method and apparatus in which the position of a block used for prediction of AC coefficients and DC coefficients by the discrete cosine transform is changed responsive to a flag indicating the chrominance format adapted for setting the type and the number of chrominance pixels allocated to the luminance pixels constituting the luminance block.

In a further aspect, the present invention provides a picture decoding method and apparatus in which reading of a flag indicating the encoding state of the chrominance block and a flag indicating the encoding state of the chrominance block associated with the chrominance type is adaptively changed responsive to a flag indicating the chrominance format adapted for setting the type and the number of chrominance pixels allocated to the luminance pixels constituting the luminance block and a flag indicating the state of the encoding of the chrominance block, and in which the encoded picture data is decoded responsive to the read-in flags.

In a further aspect, the present invention provides a picture decoding method and apparatus in which the position of a block used for prediction of AC coefficients and DC coefficients by the discrete cosine transform is set responsive to a flag indicating the chrominance format adapted for setting the type and the number of chrominance pixels allocated to the luminance pixels constituting the luminance block.

In a further aspect, the present invention provides a furnishing medium in which the encoded picture data fur- nished has been generated responsive to a read-in flag indicating the encoding state of the chrominance block and a read-in flag indicating the encoding state of the chromi- nance block associated with the chrominance type as the reading of the flags is adaptively changed responsive to a flag indicating the chrominance format adapted for setting the type and the number of chrominance pixels allocated to the luminance pixels constituting the luminance block and a flag indicating the state of the encoding of the chrominance block.

In yet another aspect, the present invention provides a furnishing medium in which the encoded picture data is furnished as the position of a block used for prediction of AC coefficients and DC coefficients by the discrete cosine trans- form is set responsive to a flag indicating the chrominance format adapted for setting the type and the number of chrominance pixels allocated to the luminance pixels con- stituting the luminance block.

According to the present invention, the MPEG4 can be expanded to permit the use of the 4:2:2 format or the 4:4:4 format, by employing a flag indicating the chrominance format of a picture or by showing the encoding pattern of the chrominance block, using the above-mentioned means, to enable the encoding/decoding of the respective chrominance formats.

BRIEF DESCRIPTION OF THE DRAWINGS

FIG. 13 shows the sequence of padding processing in the horizontal direction.

FIG. 25 shows a former half portion of a syntax of a video object layer (VOL) constituted by a portion consecutive to video_object_layer_start_code.

FIG. 26 illustrates the definition of chroma_format.

FIG. 27 shows a portion of the syntax of a macro-block.

FIG. 28, continuing to the syntax of FIG. 35, shows the syntax of a macro-block.

FIG. 29 shows a VLC table oy the flag (mcbpc) of the I-VOP flag.

FIG. 30 shows a VLC table oy the flag (mcbpc) of the P-VOP flag.

FIG. 31 illustrates the definition of a macro-block type (MBtype).

FIG. 34 illustrates a block used in FIGS.32 and 33.

FIGS. 35A and 35B illustrate an instance of bit allocation of the flag (cbpc).

FIG. 36 illustrates the maximum value of the block count (block_count).

FIG. 37 shows a portion of the syntax showing the macro-block encoding method of the MPE in a second embodiment.

FIG. 38, continuing to FIG. 5, shows the remaining portion of the syntax of FIG. 37.

FIG. 39 illustrates the method for deciding an encoding pattern of MPEG2 used in the discriminating method for the encoding pattern of the chrominance format of B-VOP according to a third embodiment of the present invention.

DESCRIPTION OF THE PREFERRED EMBODIMENTS

Figure 1:
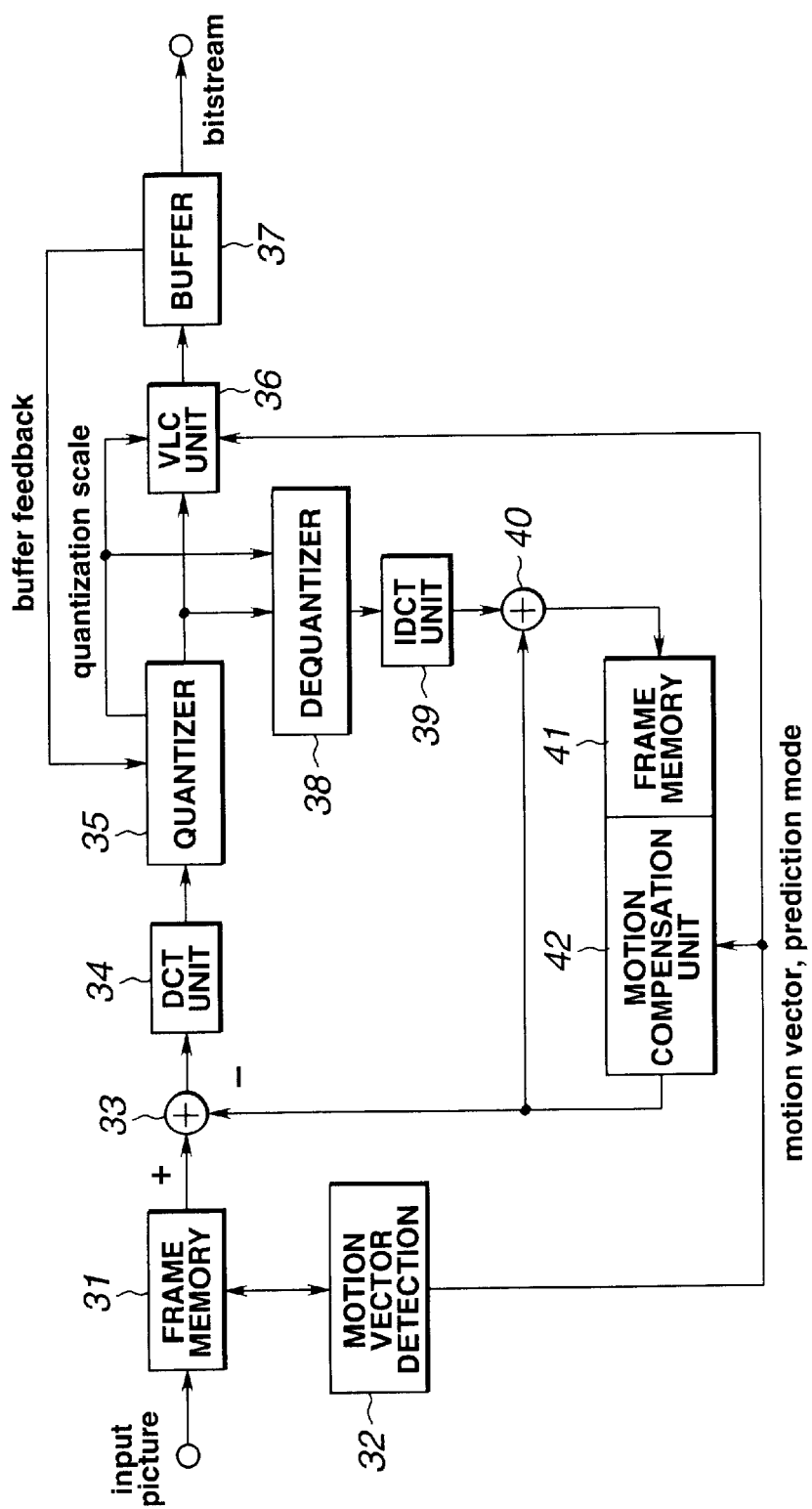
FIG. 1 is a block circuit diagram showing a schematic structure of a routine MPEG encoder.

Referring to the drawings, preferred embodiments of the present invention will be explained in detail.

Figure 6:
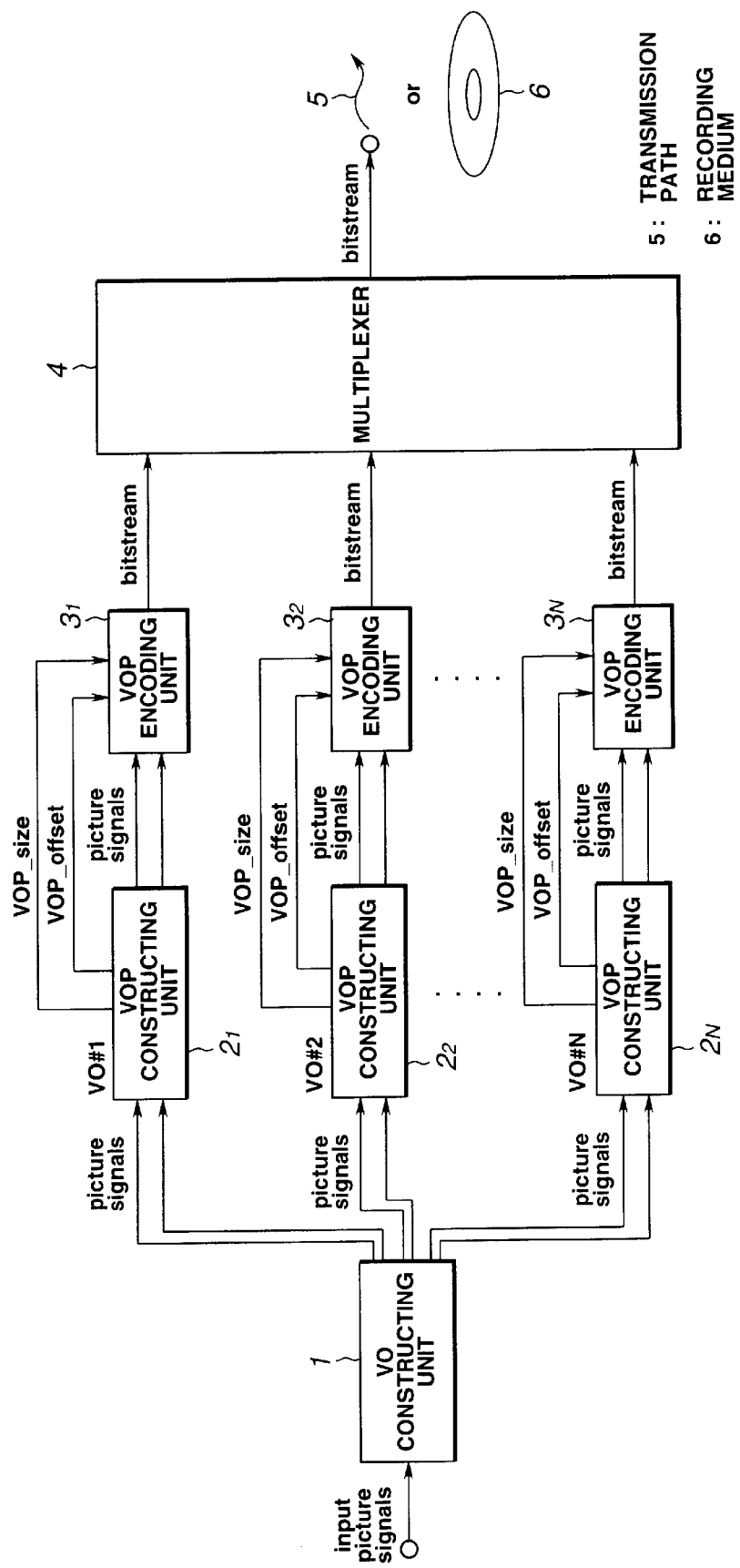
FIG. 6 is a block circuit diagram showing the sch structure of an encoder embodying the present invention.

FIG. 6 shows an illustrative structure of an encoder employing the encoding method and apparatus of the present invention. Before proceeding to the explanation of the structure of FIG. 6, some essential terms necessary for the understganding of the present invention, namely a visual object (Visual Object), a video object (Video Object), occasionally abbreviated to VO, a video object layer (Video Object Layer), occasionally abbreviated to VOL, a group of video object plane (Group of Video Object Plane), occasionally abbreviated to GOV, a video object plane (Video Object Plane), occasionally abbreviated to VOP, a group of blocks, occasionally abbreviated to GOB, a macro-block, occasionally abbreviated to MB, and a block, are explained with reference to FIGS. 7 and 8.

First, a block is constituted by, for example, 8 lines by 8 pixels neighboring to one another on the luminance or chrominance basis. The discrete cosine transform (DCT) is applied to this block as a unit. Meanwhile, the respective blocks are hereinafter indicated by numbers affixed to the respective blocks of FIG. 8.

The arrangement of the respective blocks in the macro-block in the 4:2:0 format is explained with reference to FIG. 8A, which illustrates the method of splitting blocks in a macro-block in the Visual Committee Draft, occasionally abbreviated to CD.

If the picture format is so-called 4:2:0 component digital signals, a macro-block (MB) is made up of four blocks of luminance Y, neighboring to one another in the up-and-down direction and in the left-to-right direction, and chrominance blocks Cb, Cr in the same position on the picture. That is, the MPEG4 defines the conventional 4:2:0 format macro-block as its encoded/decoded picture, with blocks 0, 1, 2, 3 of FIG. 8A indicating blocks of luminance Y and with blocks 4, 5 indicating blocks of chrominance Cb and chrominance Cr, respectively. The respective blocks are each made up of 8 by 8 pixels. The arrangement of the blocks of the luminance Y in FIG. 8A may be construed to be divided into four 8×8 blocks. In this case, in the 4:2:0 format, the chrominance size is a sole macro-block made up of 8×8 pixels, this chrominance block being directly encoded without splitting. The reason each macro-block is construed to be split into 8×8 pixels is that, in MPEG, the DCT is applied to a block made up of 8×8 pixels.

In the preferred embodiment, the chrominance format is in meeting not only with the 4:2:0 format but also with the 4:2:2 and 4:4:4 formats. Since the block arrangement of FIG. 8A cannot cope with the 4:2:2 format nor with the 4:4:4 format, the block arrangement for coping with the 4:2:2 format and the block arrangement for coping with the 4:4:4 format are shown in FIGS. 8B and 8C, respectively. Similarly to the blocks of FIG. 8A, each block shown in FIGS. 8B and 8C indicates an 8×8 block.

FIG. 8B schematically shows the structure of a block in a macro-block adapted to cope with the 4:2:2 format. In the block arrangement of FIG. 8B, the luminance is constituted by four blocks 0, 1, 2, 3, while chrominance blocks Cb, Cr are made up of two 8×8 blocks 4, 6 and 5, 7, respectively. That is, the block of the luminance Y of the 4:2:2 format is a 16×16 block divided into four equal portions, as in the case of the 4:2:0 format. However, the chrominance blocks are made up of 8×16 pixels. Thus, the chrominance signals are split into two portions in the up-and-down direction, as shown in FIG. 8B.

FIG. 8C schematically shows the structure of a macro-block for the 4:4:4 format. In this 4:4:4 format, the luminance Y and the chrominance Cb, Cr are respectively constituted by 16×16 pixels, so that, when the 4:4:4 format is split into blocks, Y, Cb and Cr are each constituted by four 8×8 blocks, as shown in FIG. 8C. That is, the luminance Y is made up of blocks 0, 1, 2, 3, while the block of chrominance Cb is constituted by blocks 4, 6, 8, 10 and the block of chrominance Cr is constituted by blocks 5, 7, 9 and 11.

The vidoe object plane (VOP) specifies a sole picture constituted by one or more macro-blocks. This picture is one of an I-VOP (intra-coded picture), a P-VOP (forward predictive-coded picture) or a B-VOP (bi-directionally predictive-coded picture).

With the I-VOP (corresponding to I-picture in MPEG), the picture itself is coded (intra-coded) without relying upon motion compensation. The P-VOP (corresponding to P-picture in MPEG) basically is forward prediction coded based on a picture temporally previous to the picture being encoded. The B-VOP (corresponding to B-picture in MPEG) is bi-directionally predictive-coded based on two pictures temporally previous and temporally posterior to the picture being encoded.

A group of video object plane (Group of Video Object Plane, abbreviated to GOV) is made up at least of a sole I-VOP, 0 or at least one non-I-VOP, that is P-VOP or B-VOP. This, however, does not apply to the upper layer in case of layered (hierarchical) encoding. Whether or not a GOV is to be used is determined optionally at the time of encoding.

The video object layer (Video Object Layer, abbreviated to VOL) is made up of at least one VOP or GOV. There are no VOPs having the same display time in the VOL, such that a sequence of pictures is displayed if the VOPs are displayed in the display time sequence.

The video object (Video Object, abbreviated to VO) is made up of at least one VOL, such that, by the combination of these VOLs, it is possible to encode and decode the same object with plural resolutions and frame rates. This is illustrated in FIG. 7.

A visual object (Visual Object) is made up of a sole video object (Video Object) or one another object, such as face object (Face Object), a mesh object (Mesh Object) or a still texture object (Still Texture Object).

Figure 7:
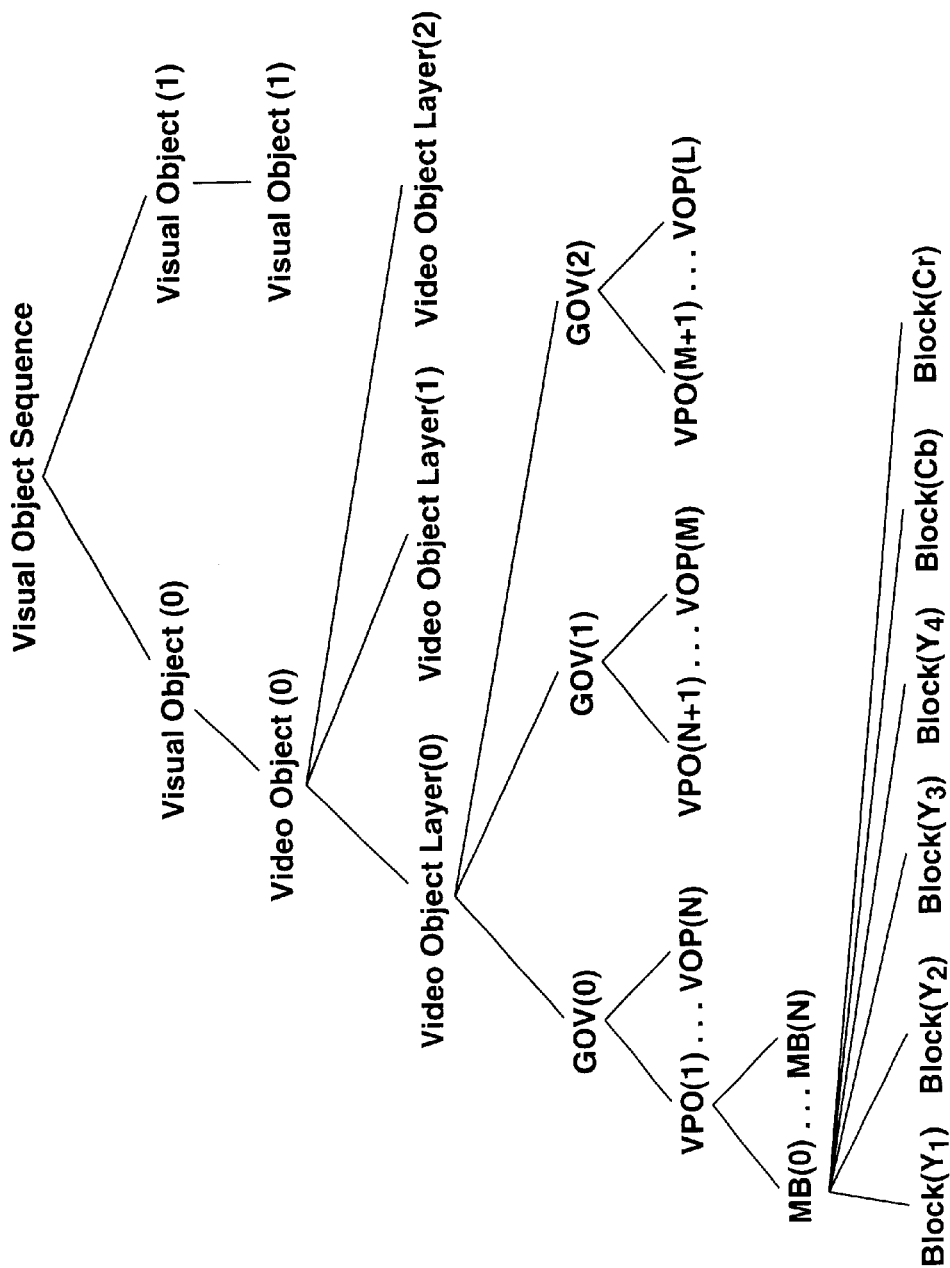
FIG. 7 illustratres the structure from a video object sequence to a block.

The video object sequence (Video Object Sequence) is made up of one or more visual objects (Visual Objects), as shown in FIG. 7.

Referring to FIG. 6, an encoder embodying the present invention is explained.

Input picture signals, that is picture (moving picture) data to be encoded, are inputted to a video object constructing unit 1. For each object constituting an input picture, the video object constructing unit 1 constructs a video object, which is a sequence of the objects, in terms of an object constituting an input picture as a unit, and outputs to VOP constructing units 21 to 2N. That is, if N VOs, namely VOP#1 to VOP#N, are constructed by the video object constructing unit 1, these N VOs VOP#1 to VOP#N are outputted to the respective associated VOP constructing units 21 to 2N, respectively.

Figure 9:
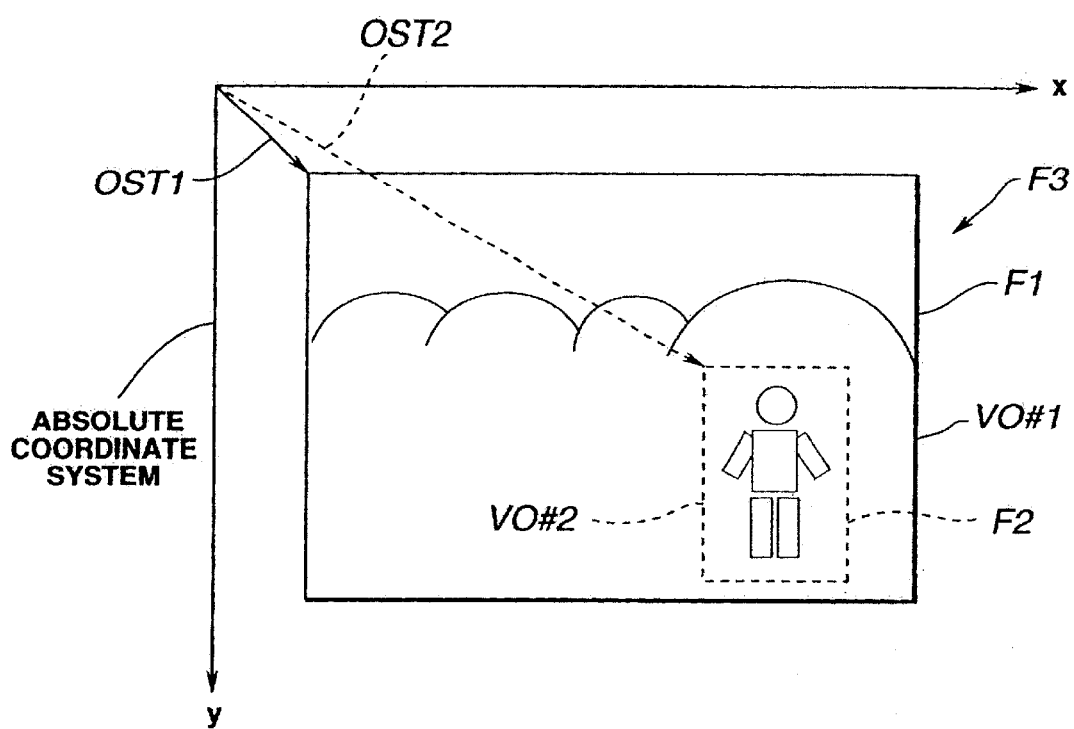
FIG. 9 illustrates the relation between a background picture and an object picture.

Referring specifically to FIG. 9, if picture data to be encoded are constituted by a sequence of the background F1 and a sequence of the foreground F2, the video object constructing unit 1 outputs the sequence of the background F1 as VO#1 to the VOP constructing unit 21, while outputting the sequence of the foreground F2 as VO#2 to the VOP constructing unit 22. Meanwhile, the embodiment of FIG. 9 shows a picture made up of the picture F1 as the background and the picture F2 as the foreground. The picture F1 images a certain natural landscape, with the sequence of the entire pictures constituting a sole VO (VO#1). On the other hand, the picture F2 is an image of a walking person, with the smallest rectangle surrounding the person being a sole VO (VO#2).

If the background F1 and the foreground F2 of the picture data for encoding are already synthesized together, the video object constructing unit 1 splits the picture into areas in accordance with a pre-set algorithm to retrieve the background F1 and the foreground F2 to output the VOs as the respective sequences to associated VOP constructing units 2n, where n=1, 2, . . . , N.

The VOP constructing units 2n make up a VOP from outputs of the video object constructing unit 1. Assume that an object is extracted from each frame and the smallest rectangle surrounding the object, referred to below as the smallest rectangle, is a VOP. The VOP constructing unit 2n constitutes a VOP so that the numbers of pixels in the transverse and longitudinal directions will be multiples of, for example, 16. On constructing a VOP, the VOP constructing unit 2n outputs the VOP to a VOP encoding unit 3n.

The VOP constructing unit 2n also detects size data (VOP_size) specifying the size of the VOP, such as the transverse and longitudinal lengths, and offset data specifying the VOP position on a frame (the coordinate value of a coordinate system having the upper left corner of frame as a point of origin) (VOP_offset) to route these data to the VOP encoding unit 3n.

The VOP encoding unit 3n encodes the output of the VOP constructing unit 2n in accordance with the system conforming to, for example, the MPEG or H.263 standard, and outputs the resulting bitstream to a multiplexing unit 4. The multiplexing unit 4 multiplexes the bitstreams from the VOP encoding unit 31 to VOP encoding unit 3N to transmit the resulting multiplexed data over transmission routes, such as ground waves, satellite network, CATV network or the like or to record the multiplexed data on a recording medium 6, such as magnetic disc, magneto-optical disc, optical disc or on a magnetic tape. The transmission medium 5 and the recording medium 6 represent embodiments of the furnishing medium of the present invention.

The VO and the VOP are hereinafter explained.

The VO is a sequence of objects making up a synthesized picture in case there is such sequence of synthesized pictures, with a VOP being a VO at a given time instant. That is, if there is a synthesized picture F3, constructed by synthesizing the pictures F1 and F2, the pictures F1 and F2 arranged chronologically are VOs, with the picture F1 or F2 at a given time instant being a VOP. Thus, a VO may be said to be a set of VOPs of the same objects at different time points.

If, as in the embodiment of FIG. 9, the picture F1 is the background and the picture F2 is the foreground, a synthesized picture F3 may be obtained by synthesizing the pictures F1 and F2 using a key signal for slicing out the picture F2. In the VOP of the picture F2, there are contained not only the picture data constituting the picture F2 (luminance signals and chrominance signals), but also the key signal used.

The sequence of picture frames is not changed in its size or position, while a VO may be changed in its size or position. That is, the VOPs making up the same VO may be temporally changed in its size or position.

Specifically, assume that a picture F1 is an image of a landscape and a picture F2 is a picture of a walking person, as shown in FIG. 9. Since the VO#1 of the picture F1 is the natural landscape, it is basically not changed in the position nor in the size, as is the usual picture frame. However, since VO#2 is a picture of a person, it is changed in its size or position by the person making movements in the left-and-right direction or in a direction perpendicular to the drawing sheet.

Therefore, the VOP encoding unit 3n in FIG. 6 is arranged so that not only encoded data of the VOP but also the information concerning the size and the position (coordinate) of the VOP in a pre-set absolute coordinate system will be included in its output bitstream. In FIG. 9, the vector specifying the position of the VOP (picture F1) of the VO#1 at a time instant is indicated by OST1, while the vector indicating the position of the VOP (picture F2) of the VO#2 at the same time instant is indicated by OST2.

Figure 10:
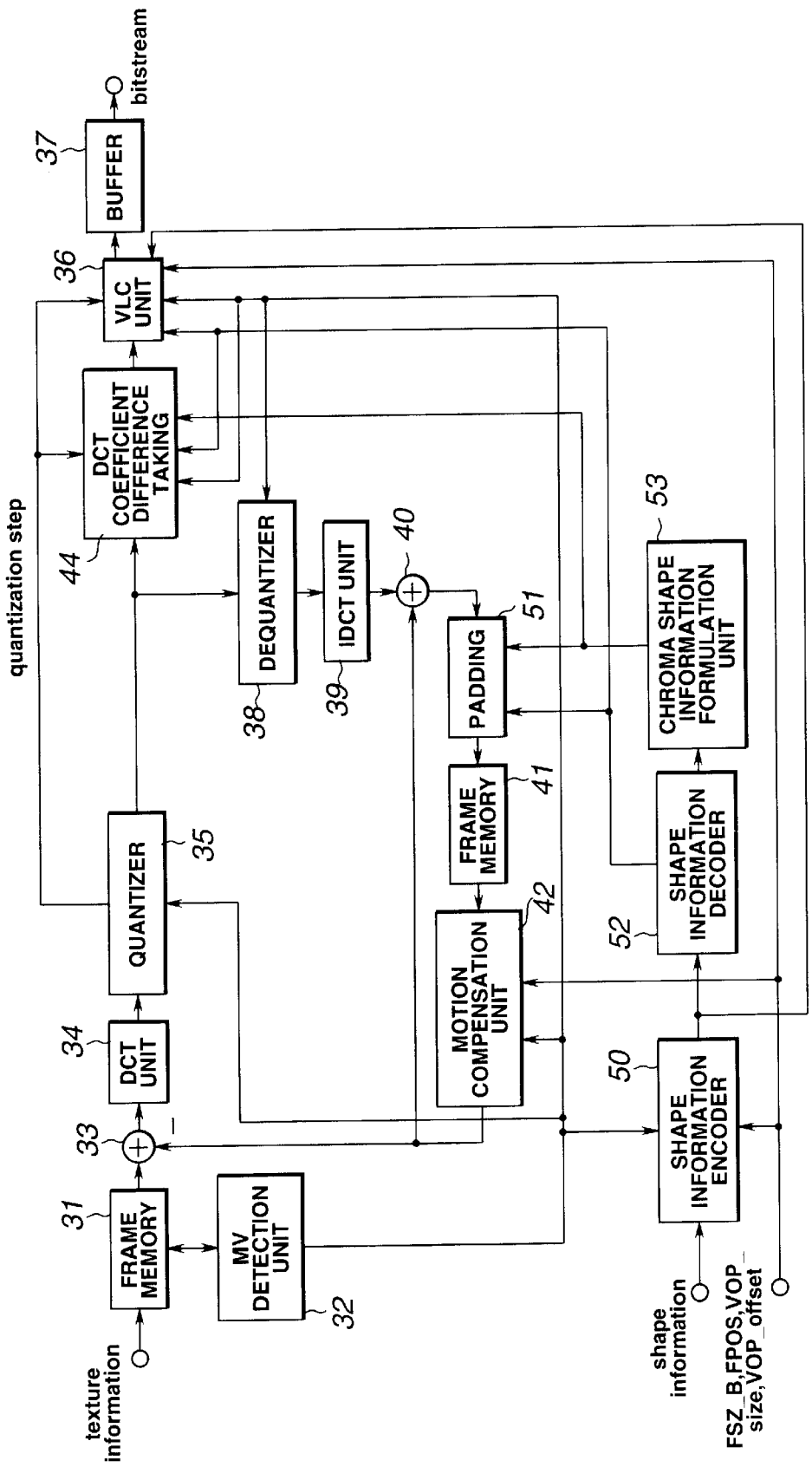
FIG. 10 is a block circuit diagram showing a detailed illustrative structure of a VOP encoding unit of an encoder of FIG. 6.

FIG. 10 shows a detailed illustrative structure of the VOP encoding unit 3n of FIG. 6. In FIG. 10, the parts of components similar to those in FIG. 1 are specified by the same reference numerals. Basically, the VOP encoding unit 3n is constituted similarly to the encoder of FIG. 1.

In FIG. 10, as in FIG. 1, picture data of an input picture are routed to the frame memory 31 for storage as a VOP.

The motion vector detector 32 detects the motion vector on the macro-block basis from the VOP stored in the frame memory 31. That is, since the VOP is varied in its size or position depending on the time (frame), a reference coordinate system for detection is set in detecting the motion vector in order to detect the movement in the coordinate system. Thus, the motion vector detector 32 sets the above-mentioned absolute coordinate system as a reference and arrays the VOP to be encoded and a VOP as a reference picture in the absolute coordinate system in accordance with the size data FSZ_B and the offset data FPOS_B in order to detect the motion vector. It is noted that the detected motion vector MV is routed, along with the prediction mode, to a shape information encoding unit 50, VLC unit 36, motion compensation unit 42, quantizer 35, dequantizer 38 and to a DCT coefficient difference taking unit 44.

For motion compensation, it is necessary to detect the movement in the reference coordinate system, as described above. Therefore, the motion compensation unit 42 is fed with the size data FSZ_B and with the offset data FPOS_B.

The arithmetic unit 33 is fed with data of the same macro-block as that in the picture data read out by the motion vector detector 32 from the frame memory 31, as in FIG. 1. The arithmetic unit 33 computes the difference between the macro-block and the predicted picture from the motion compensation unit 42. The resulting difference value is sent to the DCT unit 34.

The motion compensation unit 42 does not output a prediction picture if, as in FIG. 1, the prediction mode is the intra-coding mode. In this case, the arithmetic unit 33 directly routes data of the macro-block read out from the frame memory 31 without doing any particular processing. This also holds for the arithmetic unit 40.

The DCT unit 34 applies DCT to the output data of the arithmetic unit 33, from one block of 8 lines by 8 pixels to another, to route the DCT coefficients resulting from the DCT processing to the quantizer 35.

Similarly to the quantizer 35 of FIG. 1, the quantizer 35 quantizes the input DCT coefficients to route the quantized data to the DCT coefficient differentiation (difference taking) unit 44 and to the dequantizer 38.

The dequantizer 38 performs the same operation as that performed on the dequantizer 38 shown in FIG. 1. That is, the 8×8 quantized DCT coefficients, inputted form the quantizer 35, are dequantized and routed to the IDCT unit 39.

The IDCT unit 39 operates in the same way as the IDCT unit of FIG. 1 to apply IDCT to the DCT coefficients dequantized by the dequantizer 38 to route the resulting IDCTed coefficients to the arithmetic unit 40.

The arithmetic unit 40 is fed not only with output data of the IDCT unit 39 but also with the same output data as the prediction picture sent to the arithmetic unit 33. The arithmetic unit 40 sums the output data of the IDCT unit 39 (prediction residuals (difference data)) to the predicted picture data from the motion compensation 42 to locally decode the original picture data to output the locally decoded picture data. However, if the prediction mode is the intra-coding mode, output data of the IDCT unit 39 is passed through the arithmetic unit 40 so as to be directly supplied as the locally decoded picture data to the frame memory 41. Meanwhile, the decoded picture data are the same as the decoded picture data obtained by the receiver.

The decoded picture data obtained by the arithmetic unit 40 (locally decoded picture data) are sent as the texture information to a padding processor 51 which will be explained subsequently.

On the other hand, the shape information (key signal), input size data FSZ_B, offset data FPOS_B, VOP size data VOP_size, VOP offset data VOP_offset and the motion vector prediction mode outputted by the motion vector detector 32 are sent to the shape information encoding unit 50. The shape information encoding unit 50 encodes the shape information in accordance with the description given in the Visual Committee Draft of MPEG4. The encoded shape information is sent to a shape information decoding unit 52 and to the VLC unit 36.

The shape information decoding unit 52 locally decodes the encoded shape information, supplied from the shape information encoding unit 50, to send the data to a shape information formulating unit for chrominance 53, a padding processing unit 51, DCT coefficient difference taking unit 44 and to the VLC unit 36.

Figure 11A:
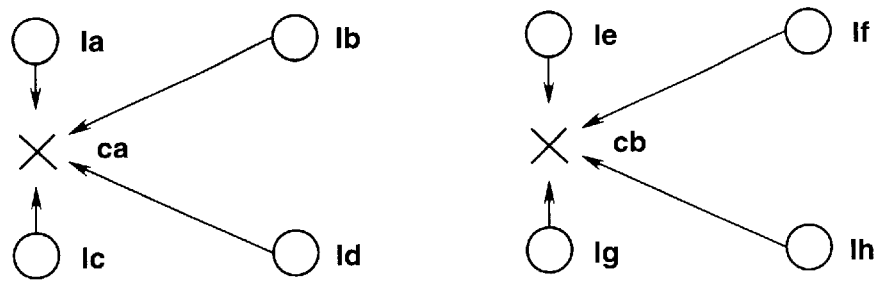
FIGS. 11A, 11B and 11C illustrate the method for formulating the shape information of the chrominance from the shape information of luminance.
Figure 11B:
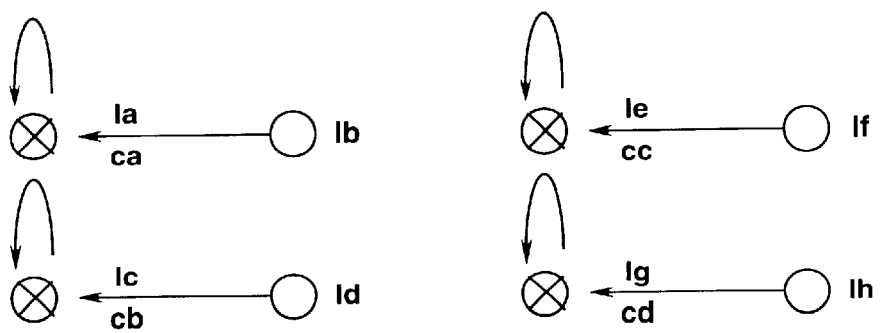
Figure 11C:
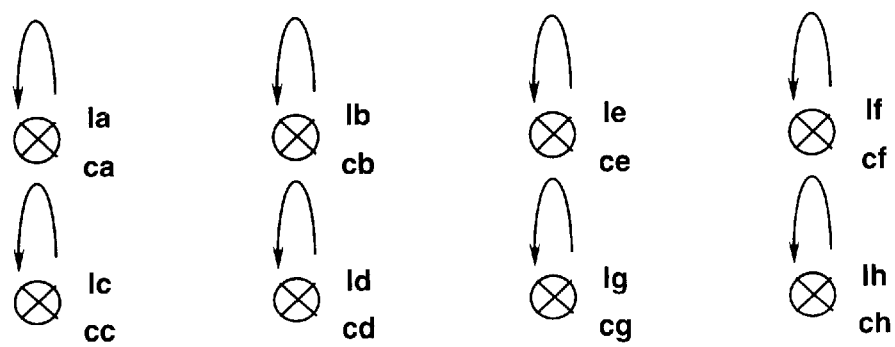

The shape information formulating unit for chrominance 53 processes the shape information depending on the form of the chrominance format. The operation of the shape information formulating unit for chrominance 53 is hereinafter explained. FIGS. 11A to 11C illustrate the method for formulating the chrominance shape information for the 4:2:0 format, that for the 4:2:2 format and that for the 4:4:4 format, respectively.

Referring to FIG. 11A, showing the case of the 4:2:0 format, pixels 1a, 1b, 1c, 1d of luminance Y and pixels ca of chrominance Cb, Cr are pixels lying at matched positions. It is noted that the chrominance pixels Cb and Cr are at the same position in FIG. 11A. Similarly, luminance pixels 1e, 1f, 1g, 1h and the chrominance pixel cb are at matched positions. The term "matched" means that, if the pixel at the position 1a is to be actually displayed, the pixel value of luminance Y at the position 1a and the pixels values of chrominance Cb, Cr at the position ca are used as the information for the pixels desired to be displayed.

In the case of the 4:2:0 format, the shape information to be sent to the next stage is only the information of the same number of pixels lying at the same position so that the information will be in one-to-one correspondence with the luminance pixels. That is, in the case of FIG. 11A, it is only the shape information matched to the positions of the luminance pixels 1a, 1b, 1c, 1d, 1e, 1f, 1g and 1h that are transmitted, while the shape information matched to the chrominance positions are not transmitted. Thus, if the chrominance signals are to be encoded, it is necessary to formulate the shape information for chrominance from the shape information for luminance, which shape information for chrominance is just as many as and at the same positions as the chrominance pixels that are in a one-for-one correspondence with the shape information for chrominance. Specifically, luminance pixels in register with the chrominance pixels ca where there exist the chrominance information Cb and Cr are 1a, 1b, 1c, 1d, so that the shape information for chrominance in register with the position of the chrominance pixel ca is formulated from the shape information lying at these positions 1a to 1d.

Usually, the shape information is transmitted as bi-level signals. If the signal is 0, it indicates the outer side of an object, whereas, if the signal is 1, it indicates the inner side of an object. Thus, if, in the 4:2:0 format, at least one of the shape information of the luminance pixels is 1, that is if the pixel is verified to be inside an object, the shape information of the corresponding chrominance is also 1 (inside the object). If the luminance pixels are all 0 (outer side of the object), the chrominance pixels are also 0 (outer side of the object). If the shape information of any of the luminance pixels 1a to 1d is 1, that is if the pixel is on the inner side of the object, the shape information for chrominance lying at ca is set to be 1, that is on the inner side of the object, whereas, if the shape information of the luminance in its entirety pixels 1a to 1d is 0, that is if the pixel is on the outer side of the object, the shape information for chrominance lying at ca is set to be 0, that is on the outer side of the object. As the shape informations for the gray scale shape (grayscale-shape), the information representing the gradation of the shape information is separately transmitted in addition to the bi-level information.

In the case of the 4:2:2 format, as shown in FIG. 11B, the luminance pixels 1a, 1b are associated with the chrominance pixel ca, where there exists the chrominance information Cb, Cr. Similarly, luminance pixels 1c, 1d are associated with the chrominance pixel cb, luminance pixels 1e, If are associated with the chrominance pixel cc and luminance pixels 1g, 1h are associated with the chrominance pixel cd. In the case of the 4:2:2 format, if one or both of the shape information of two associated luminance pixels is 1, thus indicating that the pixels are on the inner side of the object, the shape information of the associated chrominance is also 1, thus indicating the inner side of the object. In the case of, for example, FIG. 11B, if one or both of the shape information belonging to the positions of the luminance pixels 1a, 1b is 1, the shape information belonging to the position of the chrominance pixel ca is also 1. If the shape informations belonging to the positions of the luminance pixels 1a, 1b are both 0, the shape information belonging to the position of the chrominance pixel is also 0.

In the case of the 4:4:4 format, luminance pixels and chrominance pixels are arranged at the same positions, as shown in FIG. 11C. Specifically, a luminance pixel 1a is associated with a chrominance pixel ca where there exists the chrominance information Cb, Cr. In a similar manner, a luminance pixel 1b is associated with a chrominance pixel cb, a luminance pixel 1c is associated with a chrominance pixel cc, a luminance pixel 1d is associated with a chrominance pixel cd, a luminance pixel 1e is associated with a chrominance pixel ce, a luminance pixel If is associated with a chrominance pixel cf, a luminance pixel 1g is associated with a chrominance pixel cg, and a luminance pixel 1h is associated with a chrominance pixel ch. Thus, with the present 4:4:4 format, the shape information belonging to the position of the luminance pixel 1a can be directly used as the shape information of the chrominance pixels Cb, Cr lying at the chrominance pixel ca. The remaining chrominance pixels cb, cc, cd, ce, cf, cg and chrominance similarly use the shape information belonging to the positions of the associated luminance pixels 1b, 1c, 1d, 1e, 1f, 1g and 1h, respectively.

In this manner, the shape information formulating unit for chrominance 53 formulates the shape information for chrominance, in meeting with the chrominance format used for encoding, from the shape information lying at the same position as the luminance pixels. The shape information for chrominance, formulated by the shape information formulating unit for chrominance 53, is routed to the padding processing unit 51, DCT coefficient differentiating unit 44 and to the VLC unit 36.

Figure 12:
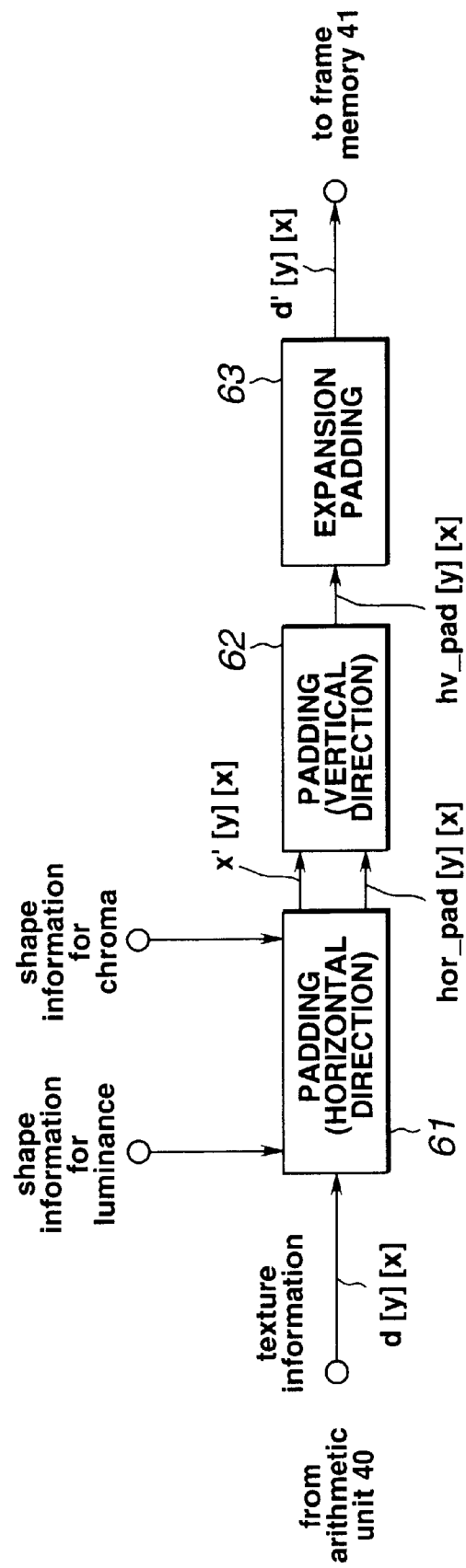
FIG. 12 is a block circuit diagram showing a detailed illustrative structure of a padding processor of FIG. 10.

The operation of the padding processing unit 51 is explained with reference to FIGS. 12 and 13. FIG. 12 shows an illustrative structure of the padding processing unit 51.

Referring to FIG. 12, the texture information, as the locally decoded picture data from the arithmetic unit 40 of FIG. 10, is routed to a padding processor for the horizontal direction 61, which is also fed from the shape information decoding unit 52 and the shape information formulating unit for chrominance 53 of FIG. 10 with the shape information used for luminance padding and the shape information used for chrominance padding.

FIG. 13 shows the operating sequence used in the padding processor for the horizontal direction 61.

The padding processing is carried out on the macro-block basis. In each macro-block, the padding processing is carried out in terms of the luminance information and two chrominance information as a unit. For padding processing on the macro-block luminance information, a pixel value of the luminance of the texture information (16 pixels by 16 pixels) is processed as variables d[y][x] in the operating sequence shown in FIG. 13, while the shape information at the registering position (16 pixels by 16 pixels) is processed as variables s[y][x] in the operating sequence shown in FIG. 13. In case of padding processing for the chrominance information, the texture information and the shape information for chrominance are processed as the variable d[y][x] and s[y[[x], respectively. For the chrominance information, the number of pixels for processing for the 4:2:0 format is 8 pixels by 8 pixels, while that for the 4:2:2 format is 8 pixels by 16 pixels and that for the 4:4:4 format is 16 pixels by 16 pixels.

The padding processing in the padding processor for the horizontal direction 61 is performed on the line basis. That is, the padding processor for the horizontal direction 61 sequentially performs the padding processing, in terms of a line of a macro-block as a unit, to effect the padding in the horizontal direction. If no pixel in the object exists in a line being processed by the padding in the horizontal direction, the padding processing is not performed for the line in question. The processing of FIG. 13 is performed if at least one object exists on the horizontal line.

The texture information and the shape information, processed with the padding in the horizontal direction by the padding processor for the horizontal direction 61, are routed to a padding processor for the vertical direction 62. The texture information routed to the padding processor for the vertical direction 62 is represented by a variable hor_pad [y][x] in the operating sequence shown in FIG. 13, while the shape information routed to the padding processor for the vertical direction 62 is represented by a variable s'[y][x] in the operating sequence shown in FIG. 13. In the operating sequence of FIG. 13, the variables x' and x" indicate the position of a pixel on the boundary of an object lying on the left side of x on the horizontal line being padded and the position on the boundary of the object lying similarly on the right side of x on the horizontal line being padded, respectively.

Figures 14, 15:
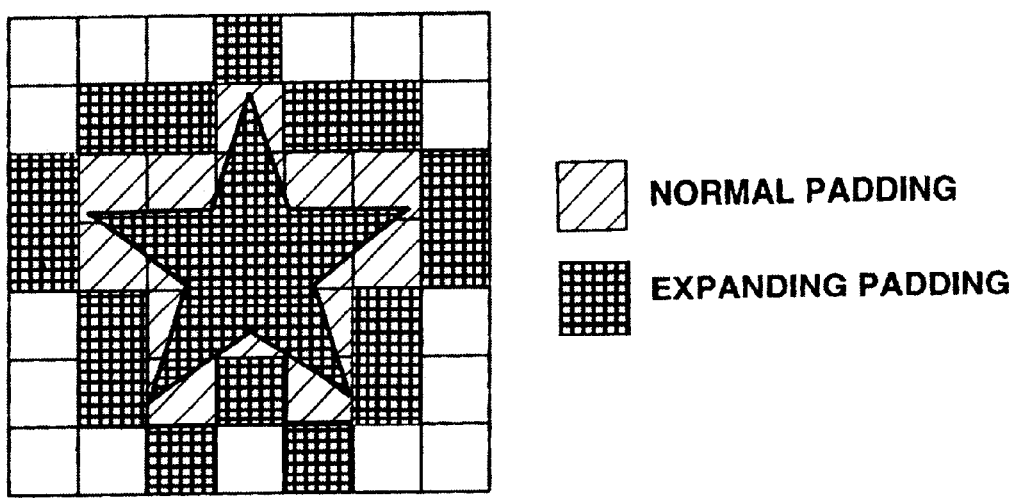
FIG. 14 shows the sequence of padding processing in the vertical direction.
FIG. 15 illustrates a macro-block processed by expanded padding.

FIG. 14 shows an operating sequence effected by the padding processor for the vertical direction 62.

In this operating sequence, shown in FIG. 14, the variable hor_pad[y][x] is the texture information padded in the horizontal direction, while the variable s'[y][x] is the shape information modified during padding in the horizontal direction. Both of these variables have been supplied from the padding processor for the horizontal direction 61.

In the padding processor for the vertical direction 62, as in the padding processor for the horizontal direction 61, the number of pixels for processing for the 4:2:0 format is 8 pixels by 8 pixels, while that for the 4:2:2 format is 8 pixels by 16 pixels and that for the 4:4:4 format is 16 pixels by 16 pixels.

The texture information, padded now in the vertical direction by the padding processor for the vertical direction 62, is represented by the variable hv_pad[y][x] in the operating sequence shown in FIG. 14. In the operating sequence, shown in FIG. 14, the variable y' and " denote the position of a pixel on the boundary of the object lying above and below y in a vertical line for padding, respectively.

The padding processing by the padding processor for the vertical direction 62 is performed from one vertical line to another. That is, the padding processor for the vertical direction 62 sequentially effects the padding in terms of the vertical lines of a macro-block as a unit. If there is no pixel in the object in the line for padding in the vertical direction, no padding processing is performed for the line. If there is one or more object in a vertical line, the processing shown in FIG. 14 is performed. The variable hv_pad[y][x] in the operating sequence of FIG. 14 is sent to an expansion padding unit 63.

Figure 16A:
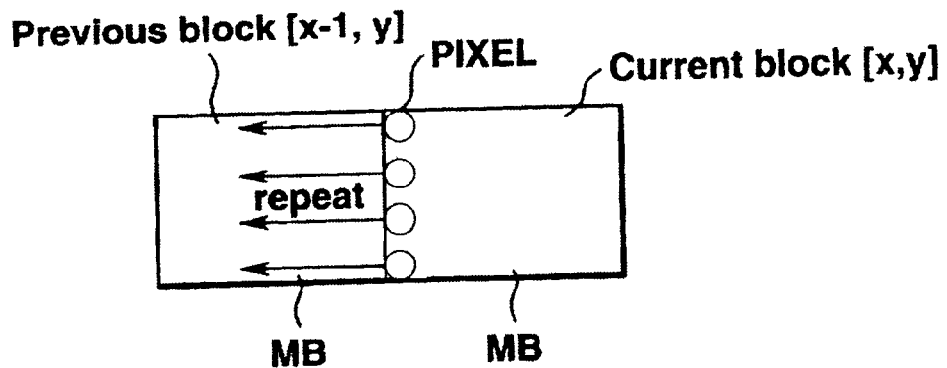
FIGS. 16A, 16B illiustrates expanded padding processing.
Figure 16B:
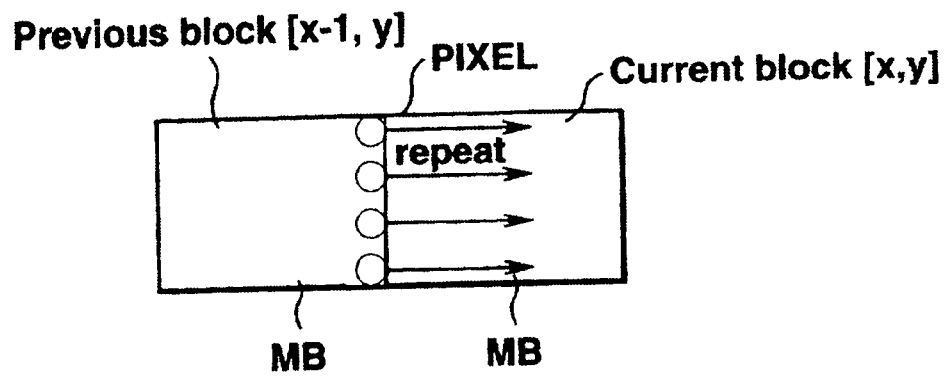
Figure 17:
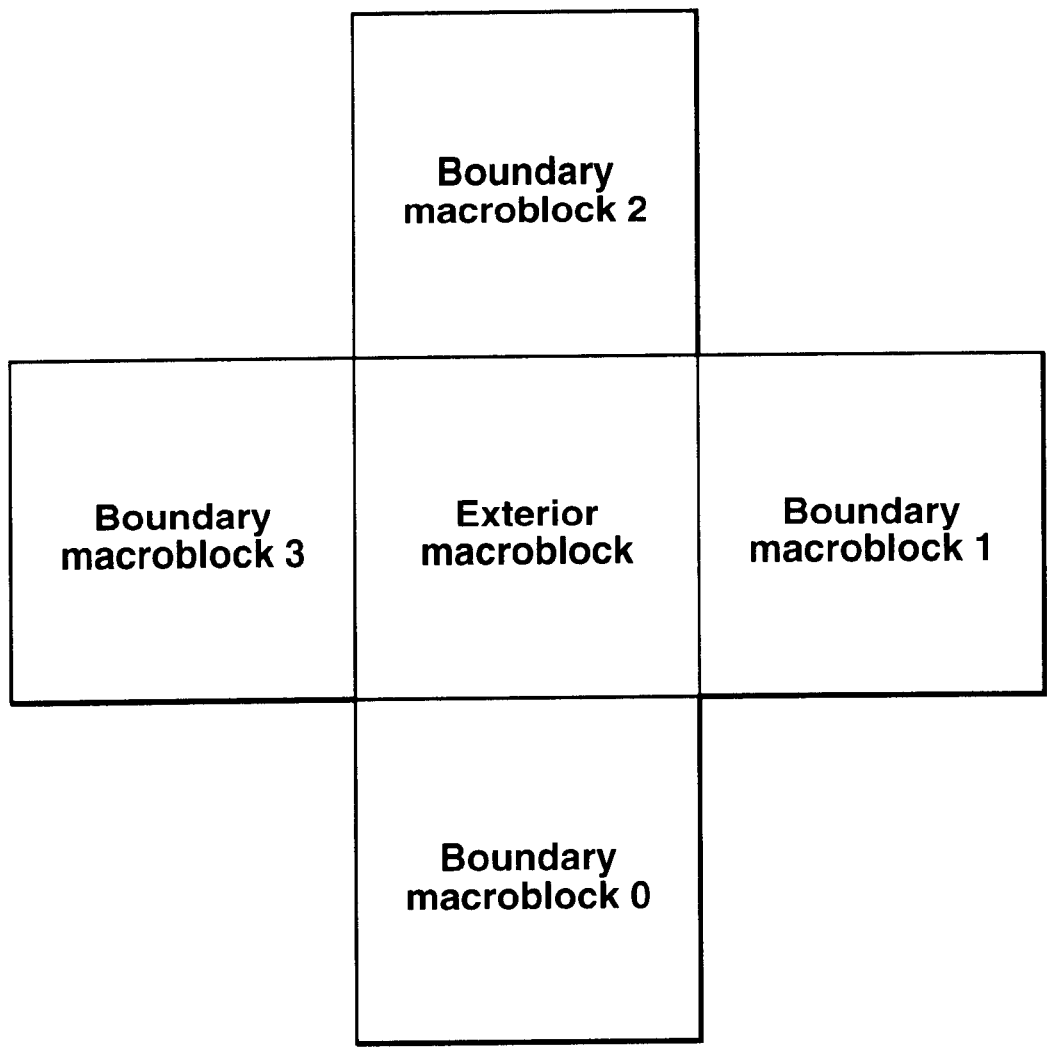
FIG. 17 shows the sequence of macro-blocks to which reference is had in case a padded macro-block is surrounded by macro-blocks having plural object boundaries.

The expansion padding unit 63 performs padding on neighboring macro-blocks lying on upper and lower sides and on left and right sides of macro-blocks lying in a boundary region of an object. That is, in the example of FIG. 15, black macro-blocks are subjected to expanded padding. The macro-blocks, subjected to expansion padding, are padded using pixel values at the ends of the macro-blocks lying on the boundaries of the neighboring objects, as shown in FIGS. 16A, 16B. Referring to FIG. 17, if a macro-block for padding (exterior macro-block) is surrounded by plural macro-blocks having object boundaries, that is boundary macro-blocks 0 to 3, the macro-blocks to be referred to are selected in the sequence of the suffix numbers 0 to 3.

An ouptput of the expansion padding unit 63 is sent to and stored in the frame memory 41 of FIG. 10 so as to be used as reference picture data (reference frame) for a picture processed with inter-coding (forward prediction coding, backward prediction coding or bidirectional prediction coding).

The picture data stored in the frame memory 41 is outputted from the motion compensation unit 42 as picture data used for backward prediction or forward prediction.

The motion compensation unit 42 motion-compensates a picture specified by a motion compensation reference picture specifying signal (picture locally decoded and stored in the frame memory 41), based on the prediction mode and the motion vector from the motion vector detector 32, to generate a prediction pictrure which is outptutted to the arithmetic units 33, 40. That is, the motion compensation unit 42 shifts the read-out address of the frame memory 41 from the position of the block currently outputted to the arithmetic unit 33 in an amount corresponding to the motion vector, only in the forward/backward/bidirectional prediction mode, to read out picture data used for forward prediction or backward prediction from the frame memory 41 to output the read-out picture data as prediction picture data. For the backward prediction mode, both the picture data used for forward prediction and those used for backward prediction are read out and a mean value of the two picture data, for example, are outputted as prediction picture data. The predicted picture data, thus obtained, are sent to the arithmetic unit 33 as a subtractor to generate difference data.

The prediction picture data from the motion compensation unit 42 is also sent to the arithmetic unit 40 operating as an adder. In the case of the forward/backward/bidirectional prediction, the arithmetic unit 40 is fed from the IDCT circuit 39 not only with the prediction picture data but also with the difference data provided by the prediction picture. The arithmetic unit 40 sums the difference data to the prediction picture from the motion compensation unit 42 to perform local decoding. This locally decoded picture is the same picture as that decoded by the decoding unit and is stored in the frame memory 41 as a picture used for forward/backward/bidirectional prediction of the next picture for processing.

If the prediction mode is the intra-coding, the arithmetic unit 40 is fed with picture data as an output of the IDCT circuit 39. The arithmetic unit 40 drectly outputs the picture data to the frame memory 41 for storage.

In MPEG4, in distinction from MPEG1 or MPG2, the B-picture (B-VOP) is also used as a reference picture and hence is locally decoded and stored in the frame memory 41. It is noted that, in the present state of the art, the B-picture is used only for the upper layer for the hierachical encoding.

Turning to FIG. 10, the DCT coefficient differentiating unit 44 effects prediction processing on AC coefficients/DC coefficients on the block basis, for the DCT coefficients quantized by the quantizer 35, as described above.

That is, the DCT coefficient differentiating unit 44 effects prediction on the DC and AC coefficients of the DCT coefficients of the respective blocks of the macro-block to be intra-coded in accordance with the measures prescribed in the Committee Draft of MPEG4 (ISO/IEC 14496-2). On the other hand, the DCT coefficient differentiating unit 44 determines the blocks used for predicitng the coefficients in dependence upon the means provided in the Committee Draft on the block basis.

Figure 18:
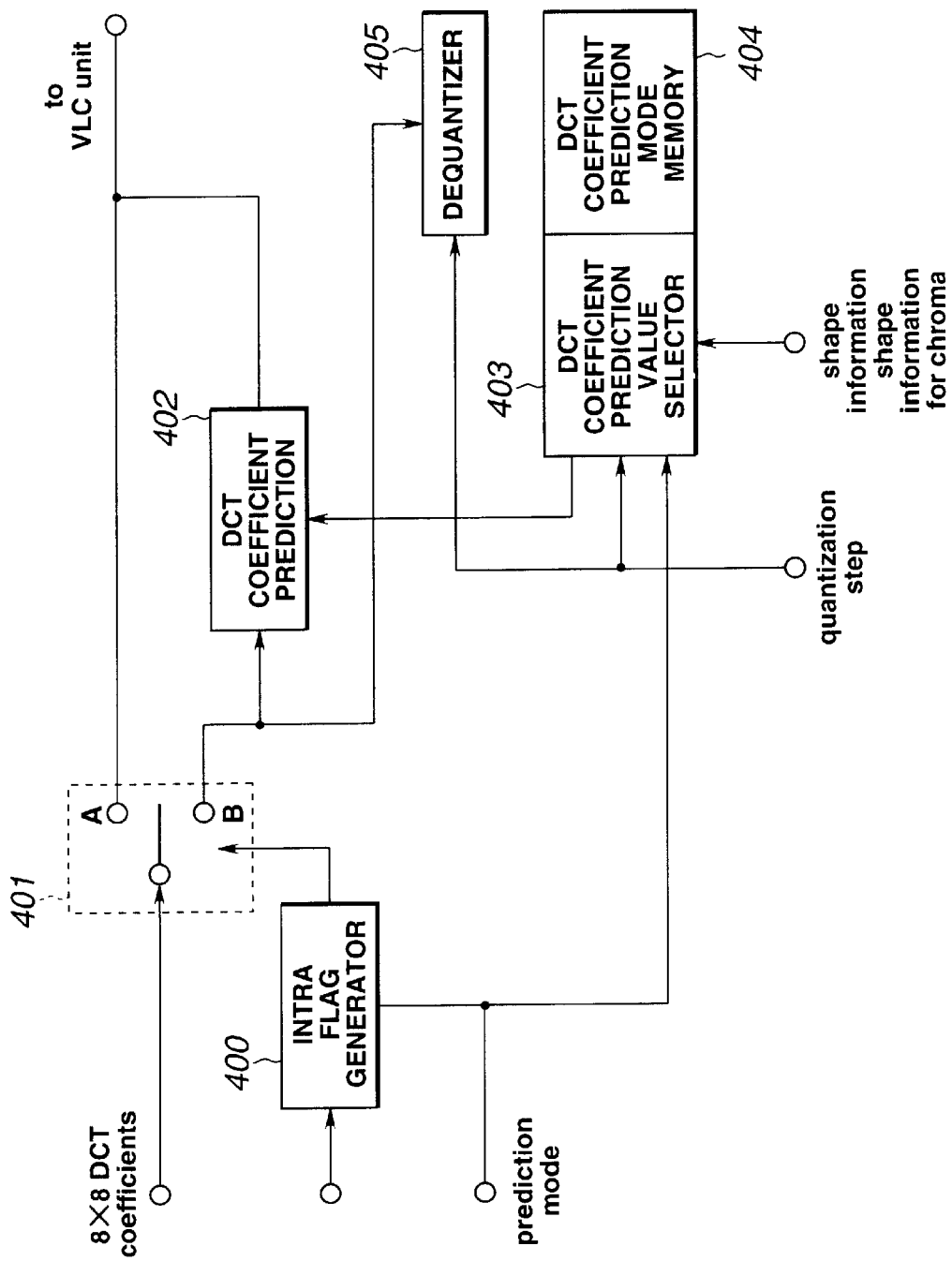
FIG. 18 is a block circuit diagram for illustrating a detailed illustrative structure of a CCT coefficient difference taking unit of FIG. 10.

FIG. 18 shows an illustrative structure of the DCT coefficient differentiating unit 44.

Referring to FIG. 18, the DCT coefficient differentiating unit 44 is fed with the quantized DCT coefficients, quantization scale, shape information, shape information for chrominance and with the prediction mode.

The prediction mode is inputted to an intra-flag gfenerator 400, which sets an intra-flag only if the prediction mode is that specifying the intra-coding (intra-coding mode or the intra-picture prediction mode). This intra-flag is usually 0 and is 1 for the prediction mode for the intra-coding.

On the other hand, the quantized DCT coefficients, that is 64 DCT coefficients, are sent to a switch 401. The switch 401 selects a fixed terminal A or a fixed terminal B if the intra-flag is 0 or 1, respectively. Thus, if the preeiction mode is not the intra-coding (intra-picture prediction) mode, the DCT coefficients are sent via the fixed terminal A of the switch 401 to the VLC unit 36 of FIG. 10.

If the prediction mode is the intra-coding mode, the DCT coefficients are sent to a DCT coefficient prediction unit 402 and to a dequantizer 405.

The DCT coefficient prediction unit 402 takes a difference between the DCT coefficients sent from the switch 401 and the prediction value for the DCT coefficients sent from a DCT coefficient prediction value selector 403 to route the difference to the VLC unit 36 of FIG. 10.

The dequantizer 405 dequantizes the DC coefficients and part of the AC coefficients used later for prediction of the DCT coefficients by means similar to the dequantizer 38 of FIG. 10 to send the results to a DCT coefficient prediction mode memory 404.

The DCT coefficient prediction mode memory 404 stores the DC coefficients and part of the AC coefficients of the DCT coefficients and the prediction mode, as described above. The stored information is used in the DCT coefficient prediction mode memory 404 of the next stage.

Using the DC coefficients and the information stored ion the DCT coefficient prediction mode memory 404, the DCT coefficient prediction value selector 403 outputs the predicted value of the DCT coefficients and the positions of the prediction block to send the output values to the DCT coefficient prediction unit 402.

The operation of the DCT coefficient prediction value selector 403 is explained with reference to FIG. 19 which illustrates the relative positions of the block X the DCT coefficients of which are computed and the block the DCT coefficients of which are referred to in executing the difference computations.

Figure 19:
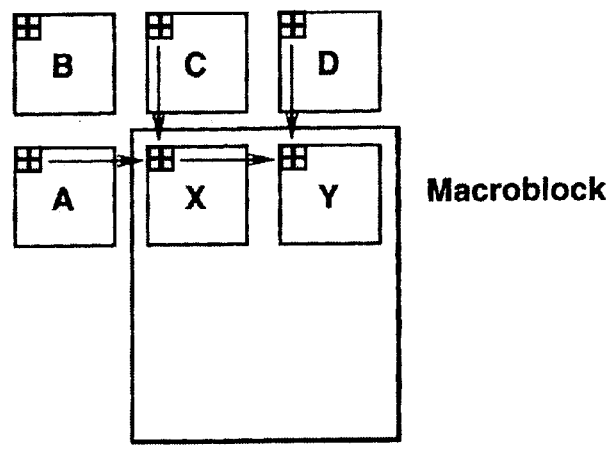
FIG. 19 illustrates the operation of a DCT component preeiction value selection unit of FIG. 18.

Referring to FIG. 19, a block lying on the left side of the block X is a block A, and a block lying above the block X is a block C, while a block lying on the left upper side of the block X is a block B. The DC coefficients of the block A are FA[0][0], while the DC coefficients of the block B are FB[0][0] and the coefficients of the block C are FC[0][0]. These values are those of the dequantized DC coefficients found by multiplying the DC coefficients of the quantized blocks A, B and C by the DC quantization step as found by the technique of FIG. 12 using the quantization scale. If these blocks are outside the VOP or are other than the intra-coded blocks, values equal to (number_of_bits—2)nd power of 2 are used. If, in the blocks A, B and C of FIG. 19, these blocks are verified to be outside the object, these DC coefficients are also the values equal to the (number_of bits—2) nd power of 2.

It is noted that the block used for obtaining the difference value of the DC coefficients of the block X is determined by the following equation (1):

$$\text{if } (|FA[0][0]-FB[0][0]|<|FB[0][0]-FC[0][0]|) \quad (1)$$

predict from block C
else
  predict from block A

Specifically, this equation (1) indicates that if, on comparison of an absolute value of the difference between FA[0][0] and FB[0][0] to an absolute value of the difference between FB[0][0] and FC[0][0], the difference between FA[0][0] and FB[0][0] is found to be smaller than the absolute value of the difference between FB[0][0] and FC[0][0], the block A is used for prediction as the prediction block, whereas, if the difference between FB[0][0] and FC[0][0] is found to be smaller than the absolute value of the difference between FA[0][0] and FB[0][0], the block C is used for prediction as the prediction block.

The DCT coefficients are quantized with the input quantization step in the same manner as with the quantizer 35 of FIG. 10. This quantization is done to set the quantization step in order since the DCT coefficients inputted to the DCT coefficient prediction unit 402 are already quantized by the same value as the quantization scale inputted to the DCT coefficient prediction value selector 403.

Figure 20:
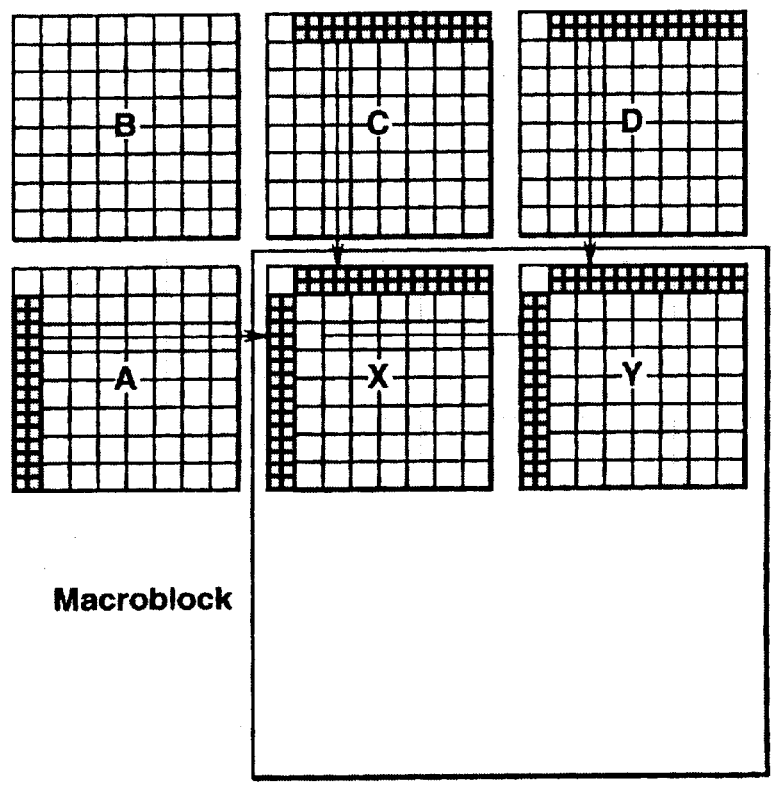
FIG. 20 illustrates DCT coefficients used for prediction (AC and DC coefficients).

The DCT coefficients used for prediction are the AC coefficients and the respective DC coefficients indicated in FIG. 20.

The method for selecting the prediction values is explained using FIG. 20.

If, in FIG. 20, the prediction block of the DCT coefficients of the block X is the block A, the AC coefficients used for the prediction are the AC coefficients for the black portion of the block A. The DC coefficients of the block A are similarly used for prediction. If the block C is the prediction block, the AC coefficients for the black portion of the block C and the DC coefficients of the block are used as prediction values.

Also, if the block A is selected as the prediction block, only the DC coefficients and the AC coefficients lying on the left side column of the block X are used for prediction and the difference is taken only of these DCT coefficients. Similarly, if the block C is selected as the prediction block, the AC coefficients and the DC coefficients of the uppermost row are predicted in the block X.

As the predicted values of the DC coefficients, the value of 128 is outputted if the block selected for prediction lies outside the object or if the prediction is the inter-prediction. As for the AC coefficients, it is noted that, if the selected block lies outside the object, its AC coefficients are treated as 0.

The prediction values of the DCT coefficients, found in the DCT coefficient prediction value selector 403 as described above, are routed to the DCT coefficient prediction unit 402.

The DCT coefficient prediction unit 402 finds the difference between the predicted values of the DCT coefficients and the associated positions to output the resulting difference to the VLC unit 36 of FIG. 10.

For each chrominance format, the block used for AC/DC prediction as described above is explained with reference to FIG. 21. The method for discriminating whether or not a chrominance block is the block within the object is explained with reference to FIG. 22.

Figure 21A:
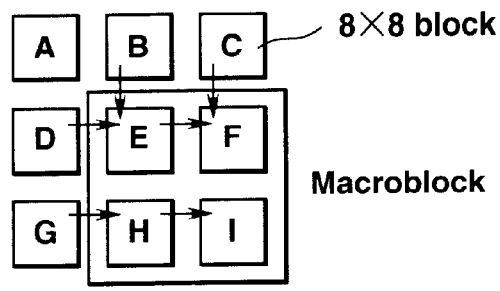
FIGS. 21A, 21B, 21C illustrate blocks used for AC/DC prediction in each chrominance format.

FIG. 21A schematically shows a block used for AC/DC in the prediction luminance blocks and the chrominance blocks of the 4:4:4 format.

That is, for predicting the AC/DC coefficients of a block E in FIG. 21A, the blocks used for the prediction are set using the blocks A, B and D. In accordance with the setting, the block B or the block D is used subsequently as the prediction block for the block E. Similarly, for predicting the AC/DC coefficients of the block F, the block B, C or E is used for setting the prediction and subsequently the prediction is made in accordance with the setting from the block C or E. For predicting the AC/DC coefficients of the block H, the block D, E or G is used for setting the prediction and subsequently the prediction is made in accordance with the setting from the block E or G. For predicting the AC/DC coefficients of the block I, the block E, F or H is used for setting the prediction and subsequently the prediction is made in accordance with the setting from the block F or H.

In doing the AC/DC prediction, it is necessary to decide whether or not each block lies within the boundary of an object.

In the case of the luminance block, this is decided using the shape information supplied form the shape information decoding unit 52 of FIG. 10. Specifically, for verifying whether a given block is within an object, reference is had to the shape information lying at the same position. If one or more pixel value having the shape information equal to 1 exists in the 8×8 pixel block of the shape information at the same position, that is if there is one or more pixel lying in the object, such block can be deemed to be a pixel in the object.

Figure 22:
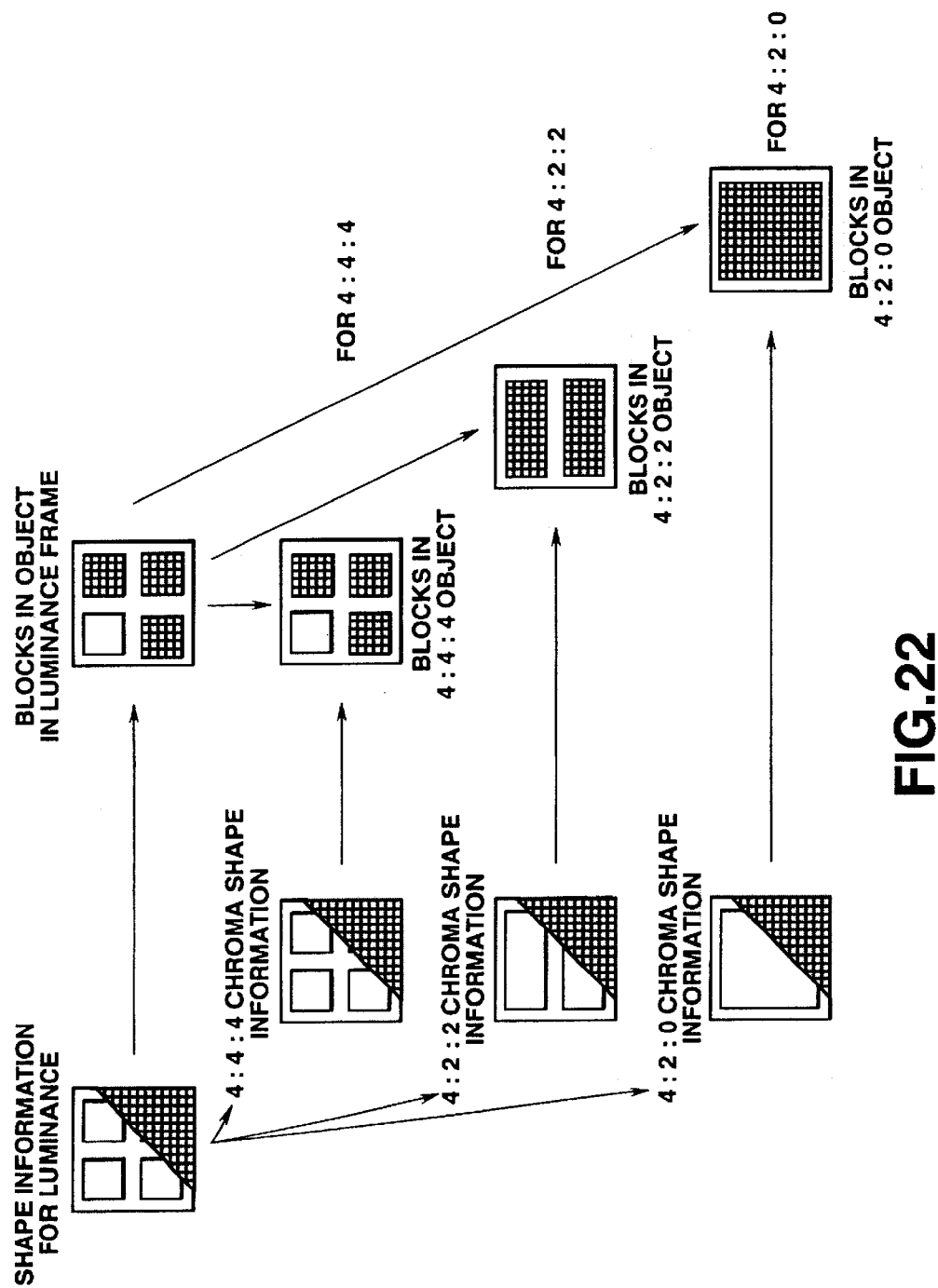
FIG. 22 illustrates the method for discriminating whether or not a chrominance block is a block in an object.

In the case of the chrominance block in the 4:4:4 format, it is possible to discriminate from the shape information for chrominance supplied from the shape information formulating unit for chrominance 53 of FIG. 10 whether or not there exist in each block one or more pixels having a pixel value of 1, that is a pixel indicating the inside of the object, as shown in FIG. 22. It is noted that the shape information for chrominance is the same as the shape information used for luminance in the case of the 4:4:4 format.

Alternatively, the above discrimination can be made depending on whether or not the luminance block present at the same position is within the object. In FIG. 8C, decision as to whether or not the block 4 or 5 is inside the object can be given from the block 0. In similar manner, decision as to whether or not the block 6 or 7 is inside the object can be given for the block 2, whereas decision as to whether or not the block 8 or 9 is inside the object can be given for the block 1. On the other hand, decision as to whether or not the block 10 or 11 is inside the object can be given for the block 3.

No matter which decision method is used, the result of decision on whether or not a chrominance block lies on the inner area of the object is the same. Therefore, the above-mentioned selection methods can be selectively used depending on the design parameters of the encoding/decoding device.

Figure 21B:
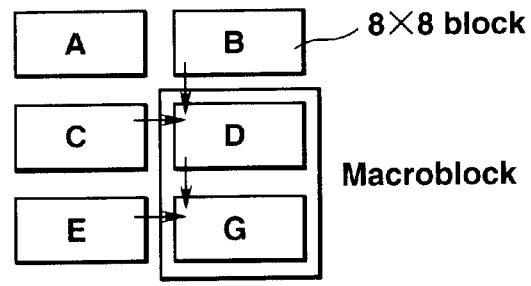

FIG. 21B schematically shows a block used for AC/DC prediction in the chrominance block of the 4:2:2 format.

In predicting the AC/DC coefficients of the block D in FIG. 21B, the block used for the prediction is first decided using the blocks A, B and C. Depending on the decision, the block B or C is used as the prediction block for the block D. In similar manner, the AC/DC coefficients of the block G are predicted using the blocks C, D and E for decision of prediction and, in accordance with the decision, prediction is made from the block D or E.

In this 4:2:2 format, as in the case of the chrominance block of the 4:4:4 format, described above, it is necessary in making the AC/DC prediction to decide whether or not each block lies within the object boundary.

In the case of the chrominance block in the 4:2:2 format, it is possible to discriminate from the shape information for chrominance supplied from the shape information formulating unit for chrominance 53 of FIG. 10 whether or not there exists in each block a pixel having a pixel value of 1, that is a pixel indicating that the pixel is on the inner side of the object, as shown in FIG. 22.

Alternatively, the above decision can be given depending on whether or not a luminance block present at a position in meeting with the chrominance block being discriminated lies within the object. In FIG. 8B, for example, the block 4, 5 can be discriminated to be a block within the inside of the object if one or both of the blocks 0, 1 are the block inside the object. In similar manner, the block 6, 7 can be discriminated to be a block within the inside of the object if one or both of the blocks 2, 3 are the block inside the object.

No matter which decision method is used, the result of decision on whether or not a chrominance block lies on the inner area of the object is the same. Therefore, the above-mentioned selection methods can be selectively used depending on the design parameters of the encoding/decoding device.

Figure 21C:
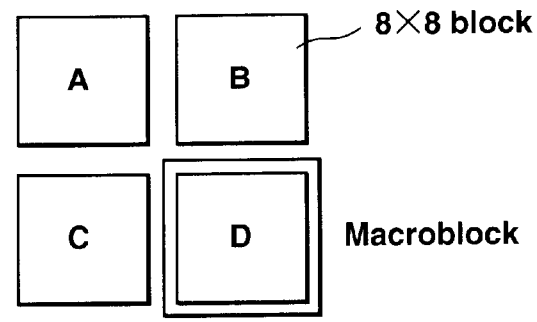

FIG. 21C schematically shows a block used for AC/DC prediction in the chrominance block of the 4:2:0 format.

In predicting the AC/DC coefficients of the block D in FIG. 21C, the block used for the prediction is first decided using the blocks A, B and C and, in dependence upon the decision, the block B or C is subsequently used as the prediction block for the block D.

In this 4:2:0 format, as in the case of the chrominance block of the 4:4:4 format or the 4:2:2 format, described above, it is necessary for the sake of AC/DC prediction to decide whether or not each block lies within the object boundary.

In the case of the chrominance block in the 4:2:0 format, it is possible to discriminate from the shape information for chrominance supplied from the shape information formulating unit for chrominance 53 of FIG. 10 whether or not there exists in each block a pixel having a pixel value of 1, that is a pixel indicating that the pixel is on the inner side of the object, as shown in FIG. 22.

Alternatively, the above decision can be given depending on whether or not a luminance block present at a position in meeting with the chrominance block being discriminated lies within the object. In FIG. 8A, for example, the block 4, 5 can be discriminated to be a block within the inside of the object if one or both of the blocks 0, 1, 2, 3 are the block inside the object.

No matter which decision method is used, the result of decision on whether or not a chrominance block lies on the inner area of the object is the same. Therefore, the above-mentioned selection methods can be selectively used depending on the design parameters of the encoding/decoding device.

Reverting to FIG. 10, the VLC unit 36 is fed not only the quantization coefficients, quantization step, motion vector and the prediction mode, but also with size data FSZ_B and offset data FPOS_B, as in FIG. 1. Thus, the VLC unit 36 variable-length encodes these data in their entirety.

The VLC unit 36 decides whether or not a macro-block of an I-picture, a P-picture or a B-picture is to be a skip macro-block, and sets flags COD or MODB indicating the results of decision, as already explained with reference to FIG. 1. These flags COD and MODB are similarly variable-length encoded and transmitted. The DCT coefficients are encoded on the block basis. However, the DCT coefficients are not encoded if the block is a block outside the object.

It can be verified by the shape information decoding unit 52 whether or not each block lies on the outer side or on the inner side of the object in the case of a luminance block. In the case of the chrominance block, decision is given from the results of decision of the luminance block or the shape information for chrominance supplied from the shape information formulating unit for chrominance 53. The method for decision whether a block lies within the object may be similar to the block decision method in the DCT coefficient differentiating unit 44 for both the luminance block and the chrominance block.

Figure 23:
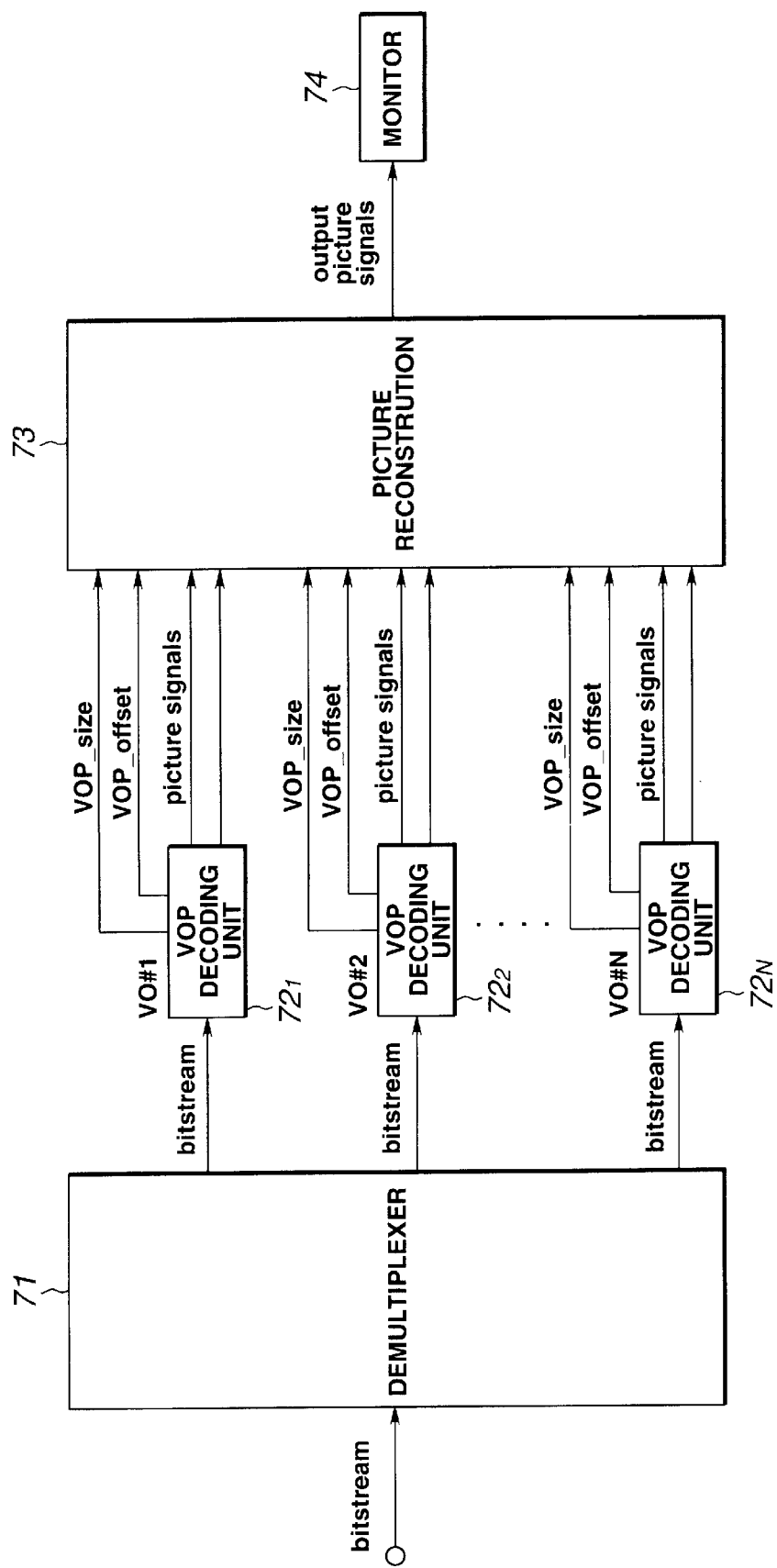
FIG. 23 is a block circuit diagram showing an illustrative structure of a decoder of the preferred embodiment for decodoing a bitstream outputted by the encoder of FIG. 6.

FIG. 23 shows an illustrative structure of an embodiment of a decoder used for decoding a bitstream outputted by the encoder of FIG. 6.

To this decoder is supplied a bitstream supplied from an encoder of FIG. 6 via transmission route 5 or recording medium 6. That is, the bitstream outputted by the encoder of FIG. 6 and transmitted via the transmission route 5 is received by a receiver, not shown, whilst a bitstream recorded on the recording medium 6 is reproduced by a reproducing device, not shown, and routed to a demultiplexer 71.

The demultiplexer 71 demultiplexes the input bitstream (VS(Video Stream as later explained)) into video-object-based bitstreams VO#1, VO#2, . . . , VO#N, which are routed to associated VOP decoding units 721 to 72N.

In the VOP decoding units 721 to 72N, the VOP decoding unit 72n decodes the VOP (picture data), size data (VOP_size) and offset data (VOP_offset), from the bitstream supplied from the demultiplexer 71, to send the decoded data to a picture re-constructing unit 73.

The picture re-constructing unit 73 reconstructs the original picture based on the outputs of the VOP decoding units 721 to 72N. The reconstructed picture signal is routed to, for example, a monitor 74. This displays a reconstructed picture on the monitor 72.

Figure 2:
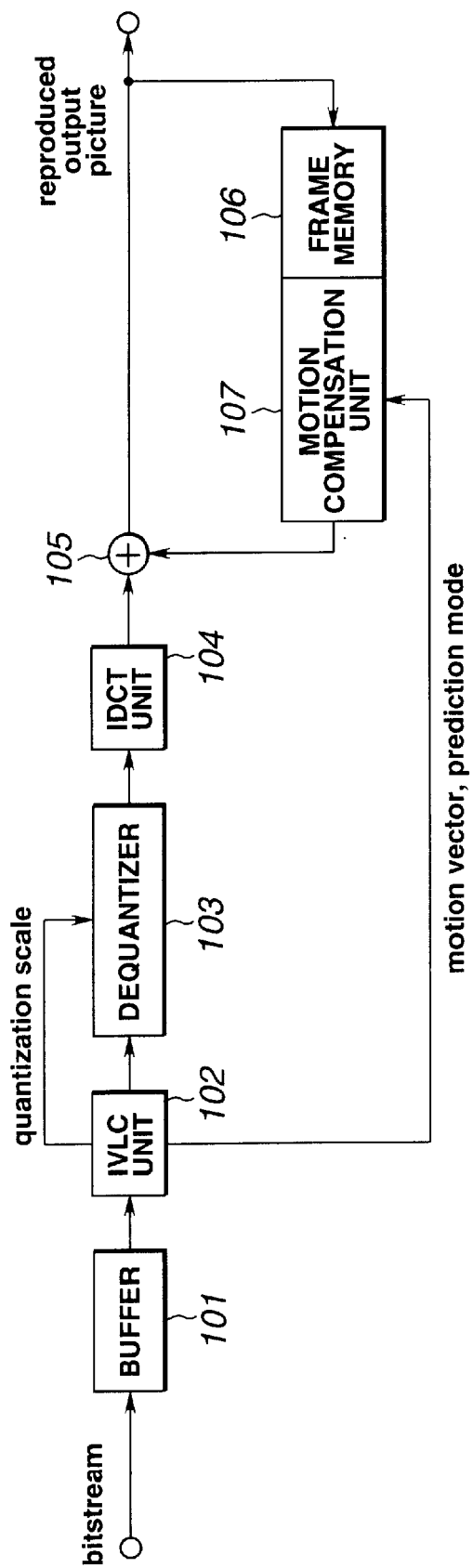
FIG. 2 is a block circuit diagram showing a schematic structure of a routine MPEG decoder.
Figure 3:
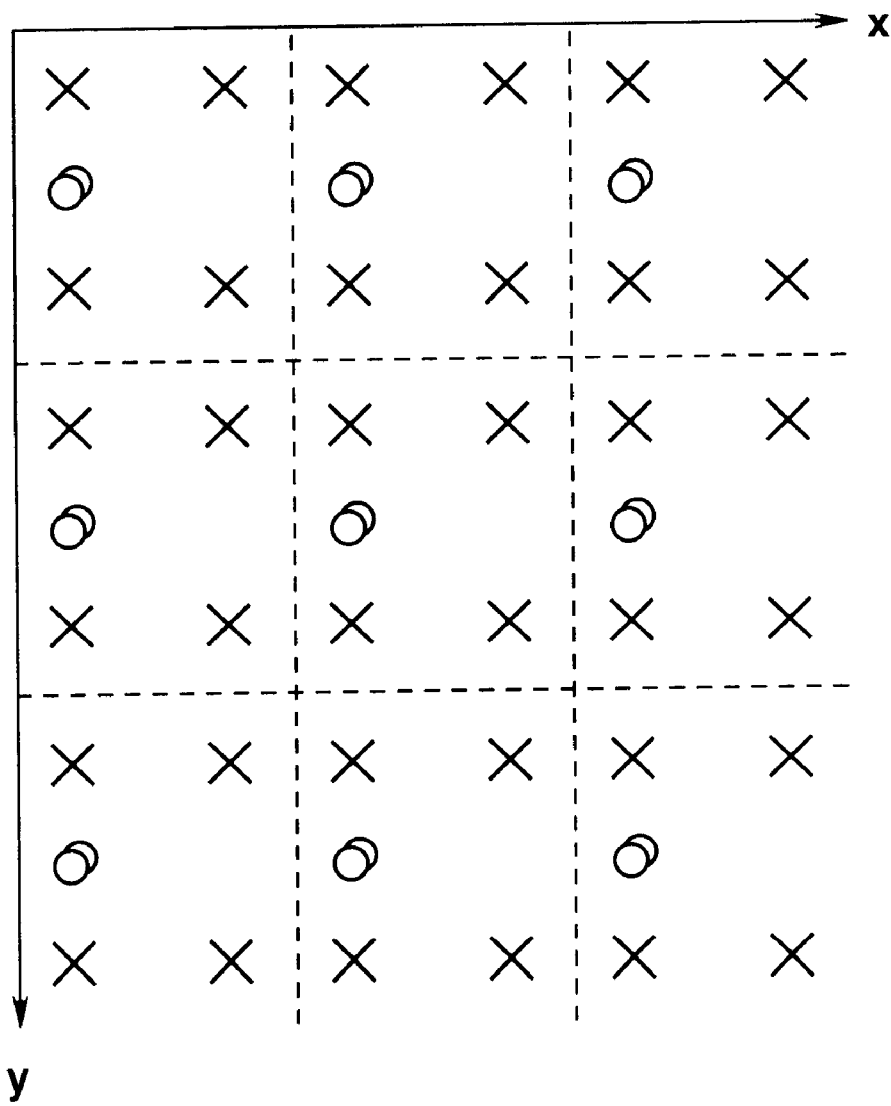
FIG. 3 illustrates the 4:2:0 format.
Figure 4:
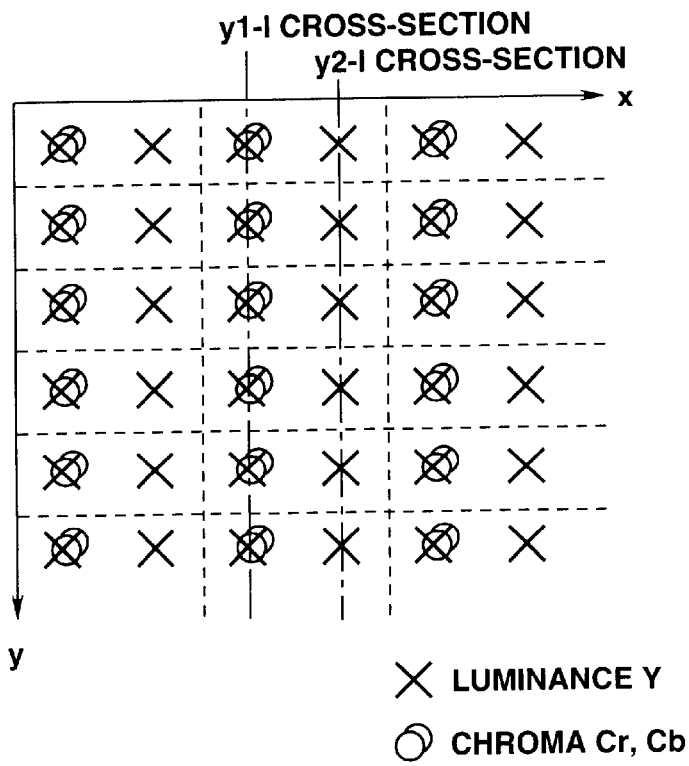
FIG. 4 illustrates the 4:2:2 format.
Figure 5:
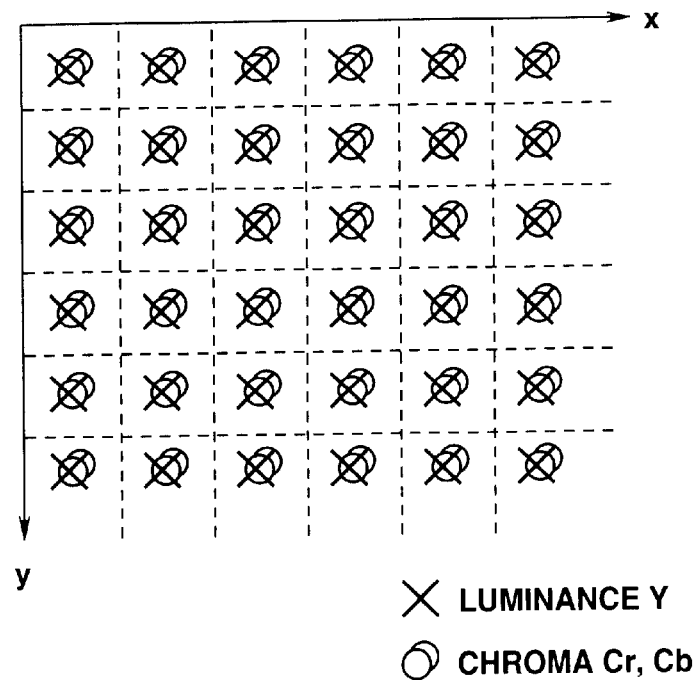
FIG. 5 illustrates the 4:4:4 format.
Figure 24:
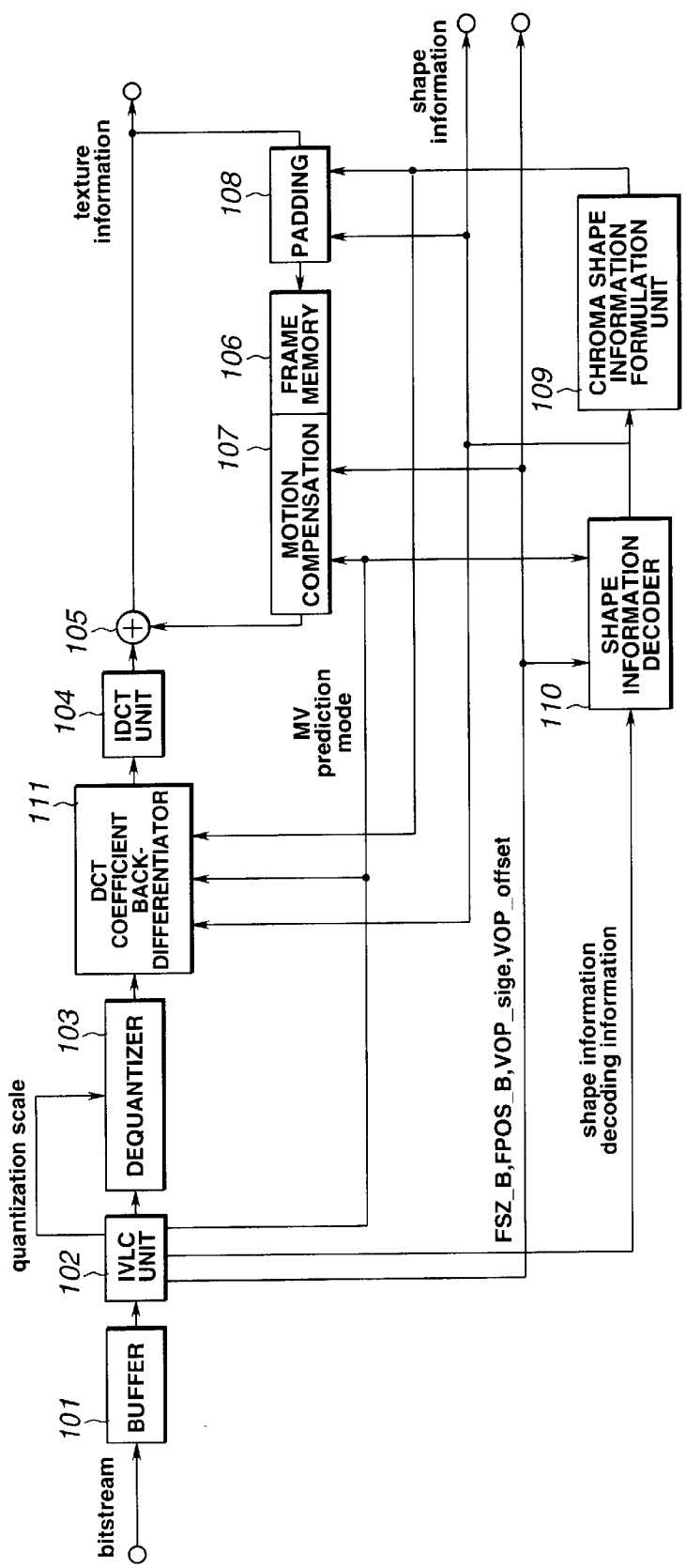
FIG. 24 is a block circuit diagram illustrating a detailed illustrative structure of a VOP decoding unit of FIG. 31.

FIG. 24 shows an illustrative structure of the VOP decoding unit 72n. In FIG. 24, the respective elements corresponding to those of the decoder of FIG. 2 are depicted by the same reference numerals. That is, the VOP decoding unit 72n is constructed basically similarly to the decoder of FIG. 2.

Referring to FIG. 24, the bitstream supplied from the demultiplexer 72n is sent to and temporarily stored in the buffer 101.

The IVLC unit 102 reads out the bitstream from the buffer 101, in association with the block processing state on the downstream side, and decodes the bitstream into variable-length codes, to separate the quantization coefficients, motion vectors, prediction modes, quantization steps, size data FSZ_B, offset data FPOS_B, shape decoding information and the flag COD from one another. The quantization coefficients and the quantization steps are sent to the dequantizer 103, whilst the motion vector and the prediction mode are sent to the motion compensation unit 107, dequantizer 103 and to an inverse DC coefficient differentiating unit 111. The size data FSZ_B and the offset data FPOS_B are sent to the motion compensation unit 107 and to the picture re-constructing unit 73 of FIG. 23. The shape decoding information is sent to the shape information decoding unit 110.

The dequantizer 103, IDCT unit 104, arithmetic unit 105, frame memory 106, shape decoding unit 110, a shape information formulating unit for chrominance 109, a padding processor 108 and the motion compensation unit 107 make up the VOP encoding unit 3n of FIG. 6, where there is performed the processing similar to that in the dequantizer 38 of FIG. 10, IDCT unit 39, arithmetic unit 40, frame memory 41, shape information decoding unit 52, shape information formulating unit for chrominance 53, padding processing unit 51 or the motion compensation unit 42.

The shape information decoding unit 110 decodes and restores the encoded shape information supplied from the IVLC unit 102. The shape information decoding unit 110 operates in the same manner as in the shape information formulating unit for chrominance 53 of FIG. 10 to convert the output of the shape information decoding unit 110 to send the converted output to the inverse DC coefficient differentiating unit 111, padding processor 108 and to the shape information formulating unit for chrominance 109.

The shape information formulating unit for chrominance 109 operates similarly to the shape information formulating unit for chrominance 53 of FIG. 10 to convert an output of the shape information decoding unit 10 in keeping with the chrominance format to send the converted output to the padding processor 108 and to the inverse DC coefficient differentiating unit 111.

The dequantizer 103 dequantizes the quantized DCT coefficients from the IVLC unit 102 based on the quantization coefficients (quantization scale) supplied from the IVLC unit 102. The dequantizer 103 operates similarly to the dequantizer 38 of FIG. 10 and routes its output to the inverse DC coefficient differentiating unit 111.

Similarly to the DCT coefficient differentiating unit 44 of FIG. 10, the inverse DC coefficient differentiating unit 111 selects the block used for predicting the block and sums the block to the DCT coefficients supplied from the dequantizer 103 to restore the AC and DC coefficients of the DCT coefficients. The DCT coefficients, thus restored, are routed to the IDCT unit 104.

Similarly to the DCT coefficient differentiating unit 44 of FIG. 10, the inverse DC coefficient differentiating unit 111 checks whether or not each block is on the inner or outer side of the object, using the shape information supplied from the shape information decoding unit 110 and the shape information for chrominance supplied from the shape information formulating unit for chrominance 109. In this decision method, the method similar to the method of using the DCT coefficient differentiating unit 44 in FIG. 10 is used.

Similarly to the IDCT unit 39 of FIG. 10, the IDCT unit 104 operates for IDCTing DCT coefficients from the inverse DC coefficient differentiating unit 111 to send the resulting data to the arithmetic unit 105.

The arithmetic unit 105 operates similarly to the arithmetic unit 40 of FIG. 10 to sum the output of the motion compensation unit 107 and the output of the IDCT unit 107 on the pixel basis if inter-frame prediction is being performed. The arithmetic unit 105 is not in operation if the encoding performed is the intra-frame coding. An output of the arithmetic unit 105 is sent to the padding processor 108, while being outputted as the texture information.

The padding processor 108 operates similarly to the padding processing unit 51 of FIG. 10 to process the output picture of the arithmetic unit 105 with padding based on the shape information outputted by the shape information decoding unit 110 and the shape information formulating unit for chrominance 109. An output of the padding processor 108 is stored in the frame memory 106.

The data stored in the frame memory 106 is occasionally invoked by the motion compensation unit 107 and outputted to the arithmetic unit 105. This operation of the frame memory 106 and the motion compensation unit 107 is similar to that of the frame memory 41 and the motion compensation unit 42 shown in FIG. 10.

Referring to FIG. 24, the VOP decoding unit 72n decodes a VOP. The decoded VOP is sent to the picture re-constructing unit 73 of FIG. 31.

The syntax of the encoded bitstream outputted by the encoder of FIG. 6 is explained based on the description of the Visual Committee Draft of the MPEG4 standard taken as an example. Meanwhile, the syntaxes now explained are prescribed by the Visual Committee Draft of the MPEG4 and hence are known so that these are not shown in the drawings. However, those syntaxes deemed to be necessary for the present invention are shown in the drawings.

With the MPEG4, it is possible not only to encode/decode two-dimensional moving picture data of a visual object (Visual Object), but also its two-dimensional still picture or face object (Face Object).

Thus, for the visual object (Visual Object) of MPEG4, first the visual object sequence (Visual Object Sequence) is transmitted. Within this visual object sequence, it is possible to transmit plural visual objects (Visual Objects) to construct a visual object sequence from plural visual objects.

In the syntax of the visual object (Visual Object), not shown, it is possible to show the type of the objects following the syntax. At present, four objects, namely a video object (Video Object), as a moving picture, a still texture object (Still Texture Object) as a still object, a mesh object (Mesh Object) indicating a two-dimensional mesh, a face object (Face Object) indicating the face shape, are defmed. The visual object (Visual Object) is followed by the syntax of any one of a video object (Video Object), a still texture object (Still Texture Object), a mesh object (Mesh Object) or the face object (Face Object).

In the syntax for user data (user_data), not shown, it is possible for the decoding side to defme and transmit data used in the visual object sequence (Visual Object Sequence), visual object (Visual Object), video object (Video Object) or in the GOV layer and which is used in decoding at the time of encoding.

In the syntax of the video object (VO), not shown, the video object is constituted by one or more VOL (Video Object Layer Class). If the pictures are not layered, it is constituted by a sole VOL. If conversely the picture is layered, it is made up of a number of VOLs corresponding to the number of layers.

In the syntax of the VOL (Video Object Layer), the VOL is the class for scalability as described above and is discriminated by the number shown by the video object layer ID (video_object_layer_id). For example, the video object layer ID (video_object_layer_id) for the lower-layer VOL is set to e.g. 0, while the video object layer ID (video_object_layer_id) for the upper-layer VOL is set to e.g. 1. It is noted that the number of scalable layers is not limited to 2 and may be any optional number inclusive of 1 or 3 or more, and that number of video object layers is not limited to 0 or 1 and may be any optional number.

The VOL is roughly made up of two syntaxes and is constituted by a portion comprised of a video object layer start code (video-object-layer-start-code) and a portion beginning from a short video start marker (short-video-start-marker).

In the syntax of the VOL (Video Object Layer), the syntax constituted by the portion next following the (video-object-layer-start-code) is explained with reference to FIG. 25. Meanwhile, FIG. 25 shows only the former half portion of the syntax of the VOL, while the latter portion thereof is not explained. The portions marked with an asterisk (*) in the drawings showing the syntaxes, such as in FIGS. 27, 28, 37 or 38, indicates noteworthy portions, such as modified portions in the preferred embodiment.

In the syntax shown in FIG. 25, the chroma format (chroma_format) denotes the types of the chrominance formats. The chroma format is defmed as shown in FIG. 26. That is, if the chroma format (chroma_format) is "01", a picture for encoding/decoding is of the 4:2:0 format. If the chroma format (chroma_format) is "10" or "11", the picture for encoding/decoding is of the 4:2:2 or 4:4:4 format, respectively.

Whether a given VOL denotes an entire picture or a portion of an entire picture can be discriminated by the video object layer shape (video-object-layer-shape). This video object layer shape (video-object-layer-shape) is a flag indicating the VOL shape and may, for example, be set as follows:

That is, if the VOL is of a rectangular shape, the video object layer shape (video-object-layer-shape) is set to, for example, "00". If the VOL is of a shape of a region extracted by a hard key, that is a binary signal which may take one of 0 or 1, the video object layer shape (video-object-layer-sbape) is set to, for example, "01", whereas, if the VOL is of a shape of a region extracted by a soft key, that is a signal that can assume a continuous value from 0 to 1 (gray scale), the video object layer shape (video-object-layer-shape) is set to, for example, "10".

It is when the VOL is of a rectangular shape, with the position and the size in the absolute coordinate form of the VOL not being changed with time, that is constant, that the video object layer shape (video-object-layer-shape) is set to "00". In such case, the size (transverse length and longitudinal length) is indicated by the video object layer width (video-object-layer-width) and the video object layer height (video-object-layer-height). The video object layer width (video-object-layer-width) and the video object layer height (video-object-layer-height) are both flags each of a fixed length of 10 bits and are transmitted once initially if the video object layer shape (video-object-layer-shape) is "00". The reason is that, if the video object layer shape (video-object-layer-shape) is "00", the size on the absolute coordinate system of the VOL is constant.

Whether the VOL is the lower layer or the upper layer is indicated by scalability (scalability) which is a one-bit flag. If the VOL is the lower layer, this scalability (scalability) is set to, for example, 1, and else to 0.

If the VOL uses a picture in a VOL other than itself, the VOL to which belongs the reference picture is represented by a reference layer ID (ref_layer_id). This reference layer ID (ref_layer_id) is transmitted only for the upper layer.

The horizontal sampling factor n (hor_sampling_factor_n) and the horizontal sampling factor m (hor_sampling_factor_m) denote a value corresponding to the horizontal length of the VOP of the lower layer and a value corresponding to the horizontal length of the VOP of the upper layer, respectively. Therefore, the horizontal length of the upper layer with respect to that of the lower layer (multiplying factor of resolution in the horizontal direction) is represented by the following equation (2):

$$(hor\_sampling\_factor\_n)/(hor\_sampling\_factor\_m) \qquad (2).$$

On the other hand, the vertical sampling factor n (ver_sampling_factort_n) and the vertical sampling factor m (ver13 sampling_factort_m) represent a value corresponding to the length in the vertical direction of the VOP of the lower layer and a value corresponding to the length in the vertical direction of the VOP of the upper layer, respectively. Therefore, the vertical length of the upper layer with respect to that of the lower layer (multiplying factor of resolution in the vertical direction) is represented by the following equation (3):

$$(ver\_sampling\_factor\_n)/(ver\_sampling\_factor\_m) \qquad (3).$$

If, in the VOL, the complexity estimation disable (complexity_estimation_disable) is 0, the define VOP estimation header (define-VOP-estimation-header) and the following are encoded/decoded.

If the short video start marker (short-video-start-marker) rather than the video object layer start code (video-objectlayer-start-code) is read at the leading end of the VOL bitstream, the syntax of the "else" row and the following rows are used for decoding the VOL bitstream.

The VOL is constituted by one or more VOPs and the video plane with short header (video-plane-with-short-header) or GOV.

The GOV layer is prescribed between the VOL and VOP layers so that it can be inserted in a desired position of an encoded bitstream. Thus, if a VOL#0 is constituted by a VOP sequence, such as VOP#0, VOP#1, . . . , VOP#n, VOP#n+1, . . . , the GOP layer can be inserted not only directly ahead of the leading VOP#0 but also directly ahead the VOP#(n+1). Therefore, in an encoder, a GOV layer can be inserted in a position in the encoded bitstream desired to be accessed, so that, by inserting plural GOV layers, a VOL sequence constituting a VOL can be encoded as it is divided by the GOV layers into plural groups (GOVs).

In the syntax of the GOV layer, not shown, the GOV layer is constituted by sequentially arranged group start code (group-start-code), time code (time_code), closed GOP (closed_gop), broken link (broken_link) and next start code (next_start_code).

Then, in a syntax of a VOP (Video Object Plane Class), the size (transverse and longitudinal lengths) of a VOP is represented by a VOP width (VOP_width) and a VOP height (VOP_height), each being of, for example, a 13-bit fixed length. The positions of the VOP in the absolute coordinate system is represented by a VOP horizontal spatial MC reference (VOP_horizontal_spatial_mc_ref) and a VOP vertical MC reference (VOP_vertical_mc_ref) each being of a 13 bit fixed length. The VOP width (VOP_width) and the VOP height (VOP_height) represent the horizontal and vertical lengths of the VOP, respectively, corresponding to the above-mentioned size data FSZ_B and FSZ_E. On the other hand, the VOP horizontal spatial MC reference (VOP_horizontal_spatial_mc_ref) or the VOP vertical MC reference (VOP_vertical_mc_ref) represent the coordinates in the horizontal direction or in the vertical direction (x-coordinate or the y-coordinate) of the VOP, respectively, these corresponding to the above-mentioned offset data FPOS_B and FPOS_E.

The VOP width (VO_width), VOP height (VOP_height), VOP horizontal spatial MC reference (VOP_horizontal_spatial_mc_ref) and VOP vertical MC reference (VOP_vertical_mc_ref) are transmitted only if the video object layer shape (video-object-layer-shape) is other than "00". That is, if the video object layer shape (video-object-layer-shape) is "00", the VOP width (VO_width), VOP height (VOP_height), VOP horizontal spatial MC reference (VOP_horizontal_spatial_mc_ref) and VOP vertical MC reference (VOP_vertical_mc_ref) need not be transmitted because the size and the position of the VOP are both constant. In this case, the VOP is arranged on the receiver so that its upper left side apex point coincides with the origin of the absolute coordinate system, with the size of the VOP being recognized from the video object layer width (video-object-layer-width) and the video object layerheight (video-object-layer-height) constituted by a portion of the syntax consecutive to the video object layer start code (video-object-layer-start-code) explained above in connection with the syntax.

The reference selection code (ref_select_code), representing a picture used as a reference picture, is defined in the VOP syntax.

The read VOP complexity estimation header (read-VOP-complexity-estimation-header) ff of the syntax is read from the VOP only if the value of the complexity estimation disable (complexity-estimation-disable) is set to "0" in the VOL.

On the other hand, the video packet header (video-packet-header) can be used only if the error resilient disable (error-resilient-disable) specifies "0" in the VOL. Moreover, the video packet header can be used freely by the encoder and can be read in from the VOP.

The video plane with short header (video-plane-with-short-header), used when the VOL begins with the short video start marker (short-video-start-marker) is explained.

The video plane with short header (video-plane-with-short-header) is used only if the VOL starts with the short video start marker (short-video-start-marker) as explained previously.

This short video start marker (short-video-start-marker) is constituted by a group of flags and plural GOB layers (gob_layer).

The GOB layer (gob_layer) denotes plural macro-blocks grouped together and encoded and the number of macro-blocks in the GOB layer is uniquely determined by a picture frame of a picture being encoded.

In the video object plane (video-object-plane), the motion shape texture (motion_shape_texture) is read in to encode the picture texture information and the shape encoding information. It is in this video object plane that the macro-block etc is encoded. The syntax of the motion shape texture (motion-shape-texture) is roughly made up of two portions, namely a data partitioning motion shape texture (data-partitioning-motion-shape-texture) and the combined motion shape texture (combined-motion-shape-texture). The data partitioning motion shape texture (data-partitioning-motion-shape-texture) is used if the 1-bit flag indicated by the VOL is 1 and if the texture information is transmitted.

The combined motion shape texture (combined-motion-shape-texture) is used when the flag (data_partitioning) is 0 or when only the shape information is transmitted. The combined motion shape texture (combined-motion-shape-texture) is made up of one or more macro-blocks.

FIGS. 27 and 28 show a portion (former halfportion) of the macro-block syntax. The macro-block syntax is roughly comprised of three portions, namely a portion specifying the macro-block syntax of the I-VOP or the P-VOP, a portion specifying the macro-block syntax of the B-VOP and a portion specifying a macro-block in the gray scale shape (GrayScale shape).

The portion specifying the macro-block syntax of the I-VOP or the P-VOP, and the portion specifying the macro-block syntax of the B-VOP are made up of a portion encoding a shape block, MB binary shape coding (mb_binary_shape_coding), a group of flags specifying the encoding state of a macro-block, a motion vector (motion_vector) of the encoding portion of the motion vector and an encoding block (block) of each block.

The portion of the macro-block specifying the information of the gray scale (Gray-scale) in a macro-block is constituted by a group of flags specifying the gray-scale (Gray-Scale) state in a macro-block and an encoding alpha block (alpha_block) of a block constituting the gray scale (Gray-Scale).

The syntax of the macro-block is roughly constituted by a syntax portion used in the I-VOP and the P-VOP and a syntax portion used in the B-VOP. The flag (mcbpc) read in for I-VOP and P-VOP is the VLC showing the coding pattern of the chrominance block of the macro-block and the macro-block type. The VLC table of the flag (mcbpc) used in the Visual Committee Draft of the MPEG4 is shown in FIG. 29.

The VLC table shown in FIG. 29 is a table for the I-VOP flag (mcbpc). FIG. 30 shows a VLC table for P-VOP.

As shown in the VLC tables of FIGS. 29, 30, the values of the flag (mcbpc) indicate two independent parameters. One is the macro-block type (MB type) and the other is the flag (cbpc). The flag (mcbpc) is encoded/decoded based on the tables of FIGS. 37 and 38. Using the tables of FIGS. 29 and 30, the macro-block type (MB type) and the flag (cbpc) are checked from the flag (mcbpc). The macro-block type (MB type) is the macro-block encoding type, while the flag (cbpc) is a 2-bit flag specifying the encoding state of the macro-block. The macro-block type (Mbtype) is stated by integers, each of which is defined as indicating the macro-block encoding type, as shown in FIG. 31. There are occasions wherein the meaning of the same number differs depending upon the VOP type.

For clarifying the method of the embodiment of the present invention, the operation of the flag (cbpc) of the macro-block layer in the Visual Committee Draft of MPEG4 is explained. The flag (cbpc) is indicated by two bits shown in FIG. 29, and shows the encoding state of the respective chrominance blocks, as discussed previously.

First, the operation of the flag (cbpc) in the 4:2:0 format is explained.

The flag (cbpc) is represented by two bits, each of which specifies the encoding state of the associated chrominance block. The leading bit of the flag (cbpc) denotes the encoding state of the block 4 shown in FIG. 8A, with the trailing bit specifying the encoding state of the block 5 of FIG. 8A. If the bit value is 1, the corresponding block is deemed to be a block for encoding/decoding. The DCT coefficients of the block are subsequently outputted/inputted based on this flag. If this bit is 0, it is verified that there exist no DCT coefficients of the corresponding block.

Figure 8A:
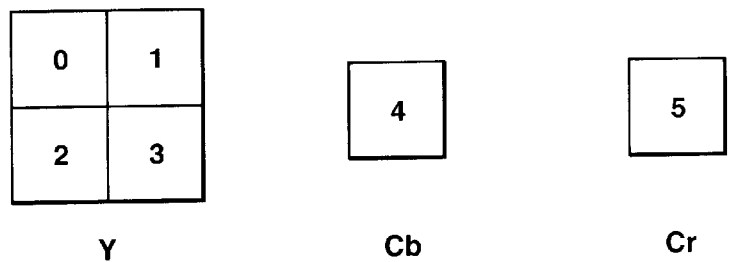
FIGS. 8A, 8B and 8C illustrate the block arrangement in a macro-block in the chrominance format.
Figure 8B:
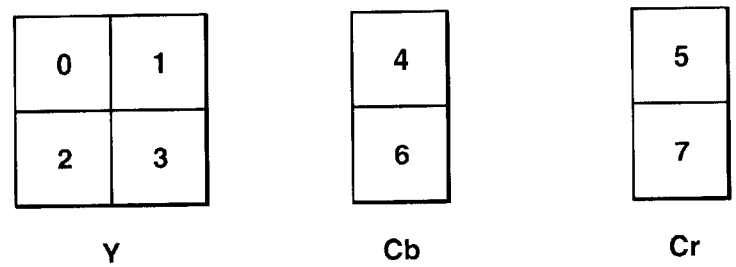
Figure 8C:
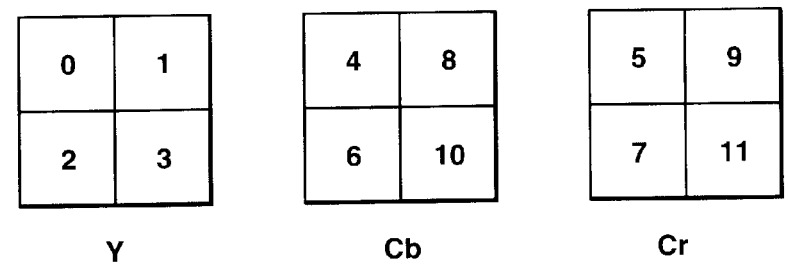

Thus, if the flag (cbpc) is "11", it is verified that there exist DCT coefficients for each of the corresponding blocks 4, 5 of FIG. 8A. If the flag (cbpc) is "10", "01" or "00", it is verified that the DCT coefficients are present only in the block 4, the DCT coefficients are present only in the block 4 block 5 and no DCT coefficients are present in the blocks 4, 5, respectively.

Also, in the preferred embodiment, the flag (cbpc) is defined for the other chrominance formats as follows:

If the chroma type (chroma_type) is "01", that is indicates the 4:2:0 format, the flag (cbpc) is defined to be of the same definition as conventionally, that is, to be a flag indicating the states of the flags specifying the blocks 4 and 5 in FIG. 8A showing the structural diagram of the macro-block of the 4:2:0 format.

If the chroma type (chroma_type) is "10" or "11", that is if the format is the 4:2:2 format or the 4:4:4 format, the 2-bit values are read in accordance with the syntax. The semantics of the flag differ from those with the 4:2:0 format. With the 4:2:2 format, the first flag or the leading flag is verified to be a flag indicating whether both or one of the blocks 4, 6 of the chrominance Cb in FIG. 8B have the DCT coefficients. With the 4:4:4 format, the first flag or the leading flag is verified to be a flag indicating that one or more of the blocks 4, 6, 8, 10 of the chrominance block Cb in FIG. 8B has the DCT coefficients.

As for the remaining one bit, it is verified with the 4:2:2 format to be a flag indicating whether or not the blocks 5, 7 of the chrominance Cr of FIG. 8B has the DCT coefficients, while being verified with the 4:4:4 format to be a flag indicating whether or not the blocks 5, 7, 9, 11 of the chrominance block Cb of FIG. 8C have the DCT coefficients.

If the flag specifies "00", it is verified that none of the chrominance blocks has the DCT coefficients in the 4:2:2 format and in the 4:4:4 format.

If the flag specifies "10" or "11", it is verified to indicate that there is a block having DCT coefficients in the block of the chrominance Cb. At this time, the flag (cbpcb) specifying the encoding state of the block of the chrominance Cb is read.

In the 4:2:2 format, the flag (cbpcb) is one or two bits, whereas, in the 4:4:4 format, it is of 1 to 4 bits.

The number of bits of the flag (cbpcb) is verified by the number of blocks lying in the inside of the object. If, with the 4:2:2 format, only one of two blocks 4, 5 of FIG. 8B lies in the inside of the object, the number of bits of the flag (cbpcb) in the macro-block is 1, whereas, if both the two blocks 4 and 5 are on the inner side of the object, a 2-bit flag is outputted.

Similarly, if, with the 4:4:4 format, only one of macro-blocks of FIG. 8C is on the inner side of the object, 1 bit of the flag (cbpcb) is outputted. Similarly, if there exist two blocks or three blocks in the inside of the object, 2 bits and 3 bits of the flag (cbpcb) are outputted, respectively. If the totality of the macro-blocks are in the inner side of the object, it is 4 bits of the flag (cbpcb) that are outputted.

The respective bits of these flags (cbpcb) represent flags indicating whether or not the macro-block that is outputted transmits the DCT coefficients. At this time, for the blocks lying outside the object, there are no texture data for encoding, as in the case of luminance, so that no encoding data is outputted and, as a matter of course, there exists no flag indicating the state in the bit of the flag (cbpcb).

In this manner, one bit each of the flag (cbpcb) is allocated to each block in the object, in the sequence shown in FIG. 8. If the flag is 1 or 0, it indicates that there are or there are not DCT coefficients in the corresponding block, respectively.

Figure 32:
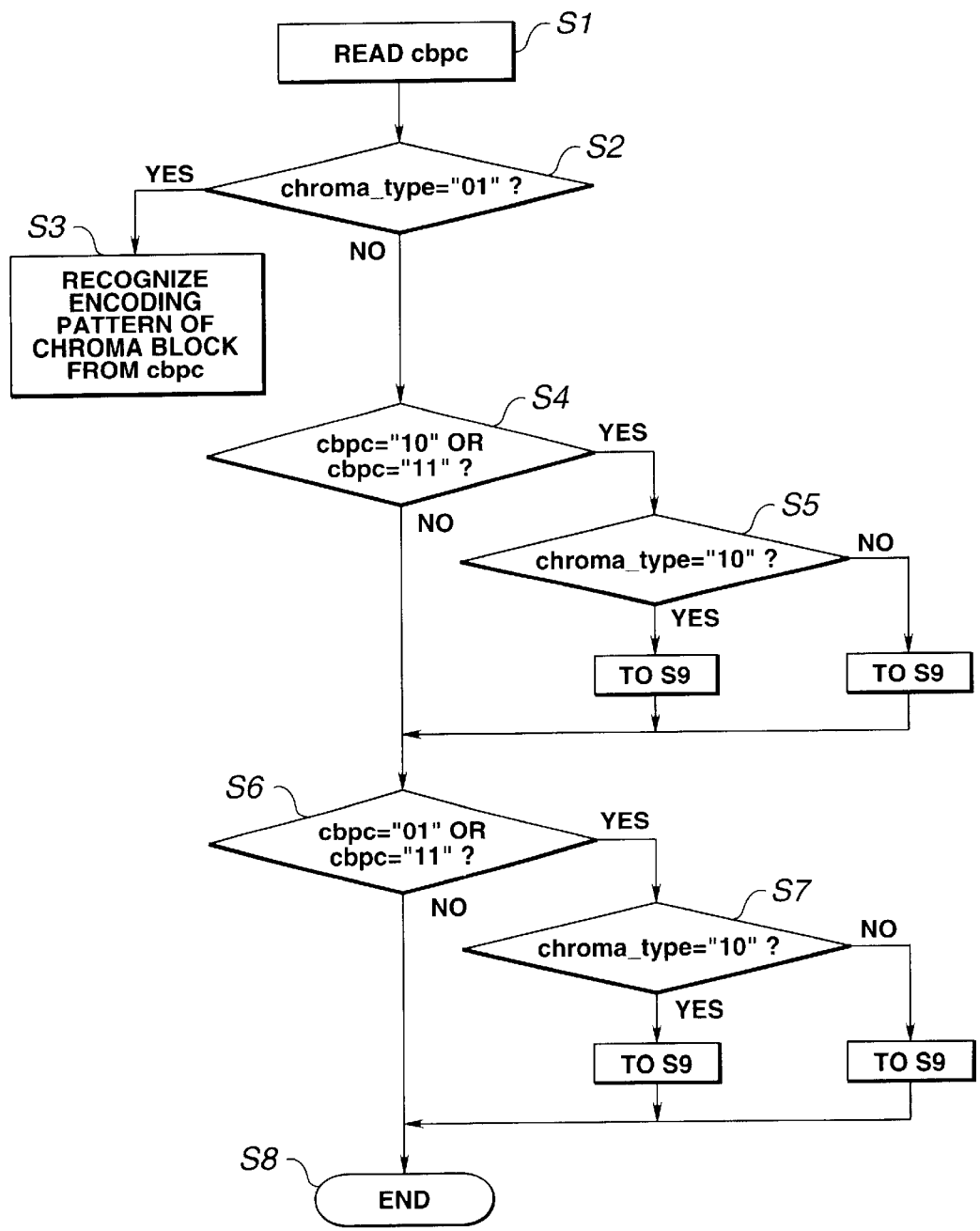
FIG. 32 is a flowchart for illustrating the sequence of the former half of the sequence of definition of the flag (cbpcb).
Figure 33:
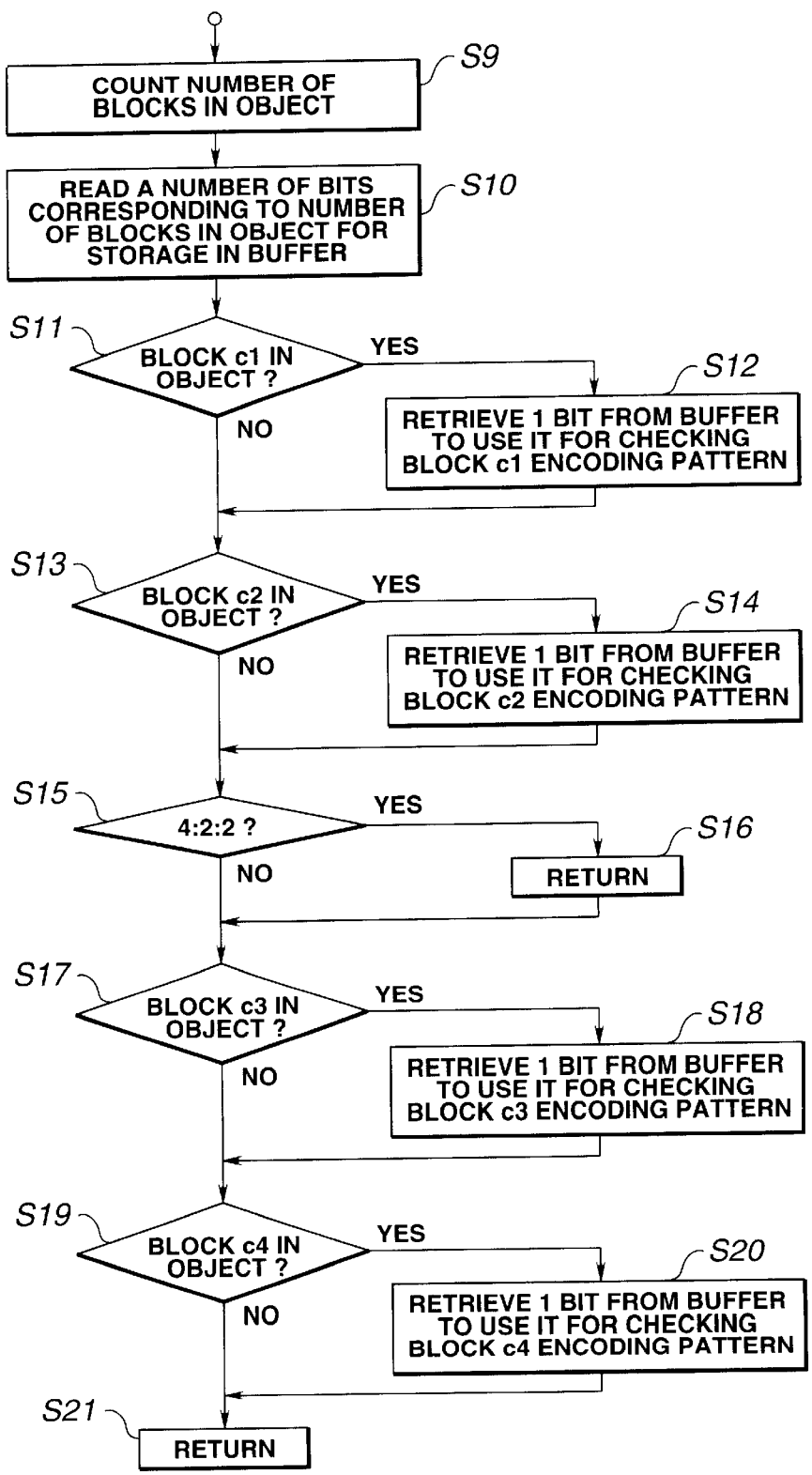
FIG. 33 is a flowchart showing the sequence of the latter half of the sequence of definition of the flag (cbpc).

FIGS. 32 and 33 illustrate the sequence of flag definition. This flowchart uses the block numbers of the chrominance shown in FIG. 34.

At step S1 the flag (cbpc) starts to be read. At step S2, it is verified whether or not the chroma type (chroma_type) is "01".

If the chroma type (chroma_type) is verified to be "01" at step S2, that is if the chroma type (chroma_type) indicates the 4:2:0 format, the flag (cbpc) is defined at step S3 as conventionally. That is, the flag is verified to be a flag specifying the state of the blocks 4 and 5 in FIG. 8A showing the structure of the macro-block of the 4:2:0 format.

On the other hand, if it is verified at step S2 that the chroma type (chroma_type) is not "01", that is if the chroma type (chroma type) is verified to be "10" or "11", that is if the format is verified to be 4:2:2 format or 4:4:4 format, the program moves to step S4.

At step S4, it is verified whether the flag (cbpc) is "01" or "11". If, at this step S4, the flag (cbpc) is verified to be "01" or "11", the program moves to step S5 and, if otherwise, the program moves to step S6.

At step S6, it is verified whether or not the flag (cbcp) is "10" or "11". If the flag (cbcp) is verified to be "10" or "11", the program moves to step S7 and, if otherwise, the program moves to step S8 to terminate the processing.

At steps S5 and S7, it is verified whether or not the chroma type (chroma_type) is "10". In either cases, the program moves to step S9 of FIG. 33.

At step S9 of FIG. 33, the number of blocks in the object is counted. At the next step S10, the number of bits equal to the number of blocks in the object is read and stored in a buffer.

At the next step S11, it is verified whether or not the block c1 shown in FIG. 34 is inside the object. If, at this step, the block c1 is in the inside of the object, the program moves to step S12 and, if otherwise, the program moves to step S13.

At step S12, 1 bit is taken from the buffer and used for verifying the encoding pattern of the block c1.

At step S13, it is verified whether or not the block c2 shown in FIG. 34 is inside the object. If, at this step S13, the block c2 is verified to be inside the object, the program moves to step S14 and, if otherwise, to step S15.

At step S14, a bit is taken out from the buffer and used for verifying the encoding pattern of the block c2.

At step S15, it is verified whether or not the format is the 4:2:2 format. If, at this step, the format is verified to be the 4:2:2 format, the program moves to step S16 and, if otherwise, to step S17.

At step S16, the program reverts to the processing of FIG. 32.

At step S17, it is verified whether or not the block c3 shown in FIG. 34 is within the object. If, at this step S17, the block c3 is verified to be within the object, the program moves to step S18 and, if otherwise, to step S17.

At this step S18, 1 bit is taken from the buffer and used for verifying the encoding pattern of the block c3.

At step S19, it is verified whether or not the block c4 shown in FIG. 34 is within the object. If, at this step S19, the block c4 is verified to be within the object, the program moves to step S20 and, if otherwise, to step S21.

At step S20, a bit is taken from the buffer and used for verifying the encoding pattern of the block c4.

At step S21, the program reverts to the processing of FIG. 32.

FIG. 35 shows an example of bit allocation for the flag (cbpcb).

FIGS. 35A and 35B show the numbers of blocks in the object and the numbers of produced bits for the 4:2:2 format and for the 4:4:4 format, respectively.

Similarly, for the 4:2:2 format and for the 4:4:4 format, if the flag (cbpc) is "01" or "11", it is verified that a block having DCT coefficients is present in the block of the chrominance Cr. The flag (cbpcb) representing the encoding state of the block of chrominance Cr of 2 bits and the flag (cbpcb) representing the encoding state of the block of chrominance Cr of 4 bits are read for the 4:2:2 format and for the 4:4:4 format, respectively.

These flags are encoded/decoded in the same manner as for the flag (cbpcb). The encoding method is varied, in the same way as for the flag (cbpcb), depending on the number of blocks in the object, these bits showing the state of DCT coefficients of the corresponding block.

In this manner, the possible presence of the DCT coefficients is verified for the totality of the chrominance blocks. The results are used subsequently in the output/input process of the DCT coefficients.

The block count (block_count) in a macro-block is the number of blocks lying in the object in a macro-block, that is (number of luminance blocks in an object+number of chrominance blocks Cb in the object+number of chrominance blocks Cr in the object).

The maximum value of the block count (block_count) is determined by the chrominance format as shown in FIG. 36.

The syntax representing the encoding method of each block in a macro-block and the method of using the results of decision on the possible presence of the DCT coefficients are explained.

It is assumed for convenience that these results of decision are stored in the arraying pattern code (pattern_code) of the syntax. For example, the pattern code [i] (pattern code [i]) denotes the encoding state of the ith block. The pattern code [1] (pattern_code [i]) indicates the state of the DCT coefficients of the block 1 shown in FIGS. 8A to 8C. In a similar manner, the pattern code [5] (pattern_code{5}) similarly shows the state of the block 5. The arraying length of the pattern code differs with the chrominance format and is 0 to 5 elements, 0 to 7 elements and 0 to 11 elements for the 4:2:0 format, 4:2:2 format and for the 4:4:4 format, respectively. These elements assume the values of 1 and 0 if the associated blocks have the DCT coefficients and if otherwise, respectively. Whether or not DCT coefficients are to be read out is determined in dependence upon the value found at the leading row. If it is an outer block of an object, the number is the lacking number, with the total number of bits stored in the pattern code coinciding with the number of blocks in an object.

The method for recognizing the encoding pattern of chrominance signals in the B-VOP is explained.

Returning to the syntax of the macro-block shown in FIGS. 27 and 28, the method for recognizing the encoding block pattern in the B-VOP is explained.

In the B-VOP, the flag (cbpb) in the syntax of the macro-block is used for indicating the encoding pattern of the macro-block. With the 4:2:0 format, the flag (cbpb) is defined in a similar manner as in the Visual Committee Draft for MPEG4.

The definition of the flag (cbpb) with the chroma type (chroma_type) of "10" (4:2:0 format), that is the flag (cbpb) of MPEG4, is explained.

The flag (cbpb) is the 3–6-bit flag, as described above, its value specifying the encoding state of each block within a macro-block. At this time, the respective bits of the flag (cbpb), beginning from the leading bit, indicate whether or not the blocks 0, 1, 2, 3, 4 and 5 shown in FIG. 8A have the DCT coefficients. If the bit is 1 or 0, it is verified that there exist or do not exist the DCT coefficients in the associated blocks, respectively. The flag (cbpb) thus read is used for the inputting/outputting of DCT coefficients in the downstream side stage. As in the case of the I-VOP and P-VOP, the number of bits coincides with the number of blocks in the object present in a macro-block. That is, if the number of the blocks in the object is three, the number of bits is three, these bits being used as flags sequentially indicating the encoding states in the object.

The method of using these results of decision is the same for B-VOP as for I-BOP or P-VOP.

The lower two bits of the flag (cbpb) indicate the encoding state of the chrominance block in the same manner as in the flag (cbpb). Therefore, the encoding pattern of the chrominance block in the 4:2:2 format and that in the 4:4:4 format are discriminated using these lower two bits and the chroma type (chroma_type) and means similar to those used for the I-VOP and P-VOP. The number of bits read if these lower two bits specify 1 also is varied depending on the chrominance format of the picture being encoded and the number of blocks in the object.

By using the chrominance format and means for determining the chrominance encoding pattern, it becomes possible to encode/decode the respective chrominance formats, namely the 4:2:0 format, 4:2:2 format and the 4:44: format.

As for the syntax of the MB binary shape coding (mb_binary_shape_coding) and the syntaxes of the motion vector (motion_vector) and the block (block), not shown, the differences of the DC coefficients are encoded in the block (block). The sub-sequence DCT coefficients (Subsequent DCT coefficients) denote other AC/DC coefficients which also are encoded by VLC.

Returning to the syntax of the motion shape texture (motion_shape_texture), if the flag of the data partitioning (data-partitioning) is 1 and if the texture information is transmitted, the data partitioning motion shape texture (data-partitioning-motion-shape-texture) is encoded. This data partitioning motion shape texture (data-partitioning-motion-shape-texture) is roughly constituted by two portions, that is the data partitioning I-VOP (data_partitioning_I_VOP) and the data partitioning P-VOP (data_partitioning_P_VoP).

Both the data partitioning I-VOP (data_partitioning_I_VOP) and the data partitioning P-VOP (data_partitioning_P_VOP) encode the group of flags representing the nature of the VOP and the DCT coefficients of the respective blocks. The encoding method for the DCT coefficients is the same as the encoding method fort the DCT coefficients described previously.

The above-described encoder and the decoder embodying the present invention may be realized by dedicated hardware or by the computer executing the program for the above-mentioned processing.

A second embodiment of the present invention is hereinafter explained.

In the present second embodiment, the first embodiment is modified so that the encoding pattern of the chrominance block in the B-VOP is found with the bit length of the flag (cbpb) being changed with the chroma type (chroma_type). That is, the present embodiment differs from the first embodiment only with respect to the syntax for encoding the macro-block and the encoding/decoding method.

The second embodiment is otherwise similar to the first embodiment, that is with respect to the encoding/decoding method or the syntax.

In the first embodiment, the flag (cbpb) is a 6-bit flag at the maximum, with its lower two bits specifying the state of the chrominance block at all times. In the present second embodiment, a flag with the maximum of 8 bits and a flag with the maximum of 12 bits are used with the 4:2:2 format and with the 4:4:4 format, respectively.

A portion (former half portion) of the syntax specifying the encoding method of the macro-block in the second embodiment is shown in FIGS. 37 and 38.

In the case of the 4:2:2 format, the 8-bit flag sequentially indicates the possible presence of the DCT coefficients of 0 to 7, beginning from the leading bit, shown in FIG. 8B.

Similarly, in the case of the 4:4:4 format, the 12-bit flag indicates, from the leading bit, the presence of DCT coefficients in the blocks 0 to 11 shown in FIG. 8C.

In both the 4:2:2 format and in the 4:4:4 format, if the associated block is outside an object, there is no flag associated with the block, in which case the bit length of the flag (cbpb) is equal in the macro-block to the number of blocks present in the object.

By using the chrominance format and the means for deciding the chrominance encoding pattern, it is possible to encode/decode the chrominance format of each of the 4:2:0 format, 4:2:2 format and the 4:4:4 format.

In this second embodiment, the encoder and the decoder can be realized by the dedicated hardware, or by the computer executing the program for carrying out the above-described processing.

A third embodiment of the present invention is hereinafter explained.

In this third embodiment, the sequence similar to that of the MPEG2 is used as the method for discrminating the encoding pattern of the chrominance format of the B-VOP.

The method for deciding the encoding pattern of MPEG2 is shown in FIG. 39.

As shown in FIG. 39, the encoding pattern is initialized to all 1 for an intra macro-block. For predictive coding, the encoding pattern is initialized at 0.

The VLC shown in FIG. 39 is then read. It is by this VLC that the values of the leading six bits of the encoding pattern are set. The information is not read further because the encoding pattern is of six bits in the case of the 4:2:0 format.

In the case of the 4:2:2 format, since the encoding pattern is represented by 8 bits, the information of two more bits is needed. Thus, after reading in the VLC to set the leading six bits of the encoding pattern, two more bits are read to obtain the information of 8 bits of the encoding pattern. Based on this information, the encoding is executed in the same way as in the first embodiment described previously.

In the case of the 4:4:4 format, the VLC is read in a similar manner, after which four more bits are read to obtain the information of a sum total of 12 bits (VLC plus six bits).

By using the chrominance format and the means for deciding the chrominance encoding pattern, it is possible to encode/decode the chrominance format of each of the 4:2:0 format, 4:2:2 format and the 4:4:4 format.

In this third embodiment, the encoder and the decoder can be realized by the dedicated hardware, or by the computer executing the program for carrying out the above-described processing.

According to the present invention, as described above, it is possible to encode/decode the chrominance format other than the 4:2:0 format by using a flag specifying the picture chrominance format or by specifying the encoding pattern of the chrominance block using the above-described means.

The furnishing medium according to the present invention furnishes not only the above-mentioned encoded data but also a program for permitting the operation of the encoder or the decoder embodying the present invention.

What is claimed is:

1. A picture encoding method for encoding a picture on a block basis constituted by a luminance block and a chrominance block, comprising the steps of:
    adding a format flag to said picture for indicating a picture format of said picture;
    adding a first coefficient flag to said picture for indicating whether or not there exist one or more coefficients to be encoded in each said chrominance block;
    selectively adding a second coefficient flag to said picture for indicating in detail whether or not there exist one or more coefficients to be encoded in said chrominance block depending on said format flag and said first coefficient flag, where the second coefficient flag is not added if the first coefficient flag indicates no coefficients exist in each said chrominance block and the value of the second coefficient flag depends on the values of the format flag and the first coefficient flag.

2. The picture encoding method according to claim 1 wherein
    the code length of the second flag is varied responsive to the format flag.

3. The picture encoding method according to claim 1 wherein the encoding is by reading in an encoding pattern from an encoding code table; and wherein
    when reading in the encoding pattern from said encoding code table, reading of the encoding pattern of the basic number of bits and reading of an encoding pattern having further bits supplemented to the basic number of bits are adaptively changed responsive to the format flag.

4. A picture encoding method for encoding a picture on a block basis in which, before encoding coefficients specifying the state of a picture by discrete cosine transform executed on a block basis constituted by a luminance block and a chrominance block, reference is had to coefficients of a neighboring block to effect predictive coding, wherein the position and number of blocks used for prediction of AC coefficients and DC coefficients by said discrete cosine transform is changed responsive to a format flag indicating a picture format adapted for setting the type and the number of chrominance pixels allocated to the luminance pixels constituting said luminance block.

5. A picture encoding apparatus for encoding a picture on a block basis constituted by a luminance block and a chrominance block, comprising:

means for adding a format flag to said picture for indicating a picture format of said picture;

means for adding a first coefficient flag to said picture for indicating whether or not there exist one or more coefficients to be encoded in each said chrominance block;

means for selectively adding a second coefficient flag to said picture for indicating in detail whether or not there exist one or more coefficients to be encoded in said chrominance block depending on said format flag and said first coefficient flag, where the second coefficient flag is not added if the first coefficient flag indicates no coefficients exist in each said chrominance block and the value of the second coefficient flag depends on the values of the format flag and the first coefficient flag.

6. The picture encoding apparatus according to claim 5 wherein said means for selectively adding the second flag to said picture varies the code length of the second flag responsive to the format flag.

7. The picture encoding apparatus according to claim 5 wherein the encoding is by reading in an encoding pattern from an encoding code table; and wherein when reading in the encoding pattern from said encoding code table, reading of the encoding pattern of the basic number of bits and reading of an encoding pattern having further bits supplemented to the basic number of bits are adaptively changed responsive to the format flag.

8. A picture encoding apparatus for encoding a picture on a block basis in which, before encoding coefficients specifying the state of a picture by discrete cosine transform executed on a block basis constituted by a luminance block and a chrominance block, reference is had to coefficients of a neighboring block to effect predictive coding, comprising:

encoding means for performing the encoding as the position and number of blocks used for prediction of AC coefficients and DC coefficients by said discrete cosine transform is changed responsive to a format flag indicating a picture format adapted for setting the type and the number of chrominance pixels allocated to the luminance pixels constituting said luminance block.

9. A picture decoding method for decoding a picture on a block basis constituted by a luminance block and a chrominance block, comprising the steps of:

reading a format flag for said picture for indicating a picture format of said picture;

reading a first coefficient flag for said picture for indicating whether or not there exist one or more coefficients encoded in each said chrominance block;

selectively reading a second coefficient flag for said picture for indicating in detail whether or not there exist one or more coefficients encoded in said chrominance block depending on said format flag and said first coefficient flag, where the second coefficient flag is not read if the first coefficient flag indicates no coefficients exist in each said chrominance block and the value of the second coefficient flag depends on the values of the format flag and the first coefficient flag; and wherein the encoded picture data is decoded responsive to the read-in flags.

10. The picture decoding method according to claim 9 wherein the code length of the second coefficient flag varies responsive to the format flag; and wherein
the encoded picture is decoded responsive to the second coefficient flag.

11. A picture decoding method for decoding a picture on a block basis in which encoded picture data obtained by having reference to coefficients of a neighboring block to effect predictive coding before encoding coefficients specifying the state of a picture by discrete cosine transform executed on a block basis is decoded, each of said blocks being made up of a luminance block and a chrominance block, wherein the position and number of blocks used for prediction of AC coefficients and DC coefficients by said discrete cosine transform is set responsive to a format flag indicating a picture format adapted for setting the type and the number of chrominance pixels allocated to the luminance pixels constituting said luminance block.

12. A picture decoding apparatus for decoding a picture on a block basis constituted by a luminance block and a chrominance block, comprising:

means for reading a format flag for said picture for indicating a picture format of said picture;

means for reading a first coefficient flag for said picture for indicating whether or not there exist one or more coefficients to be encoded in each said chrominance block;

means for selectively reading a second coefficient flag for said picture for indicating in detail whether or not there exist one or more coefficients to be encoded in said chrominance block depending on said format flag and said first coefficient flag, where the second coefficient flag is not read if the first coefficient flag indicates no coefficients exist in each said chrominance block and the value of the second coefficient flag depends on the values of the format flag and the first coefficient flag; and wherein the encoded picture data is decoded responsive to the read-in flags.

13. The picture decoding apparatus according to claim 12 wherein said means for selectively reading the second coefficient flag for said picture varies the read-in code length of the second coefficient flag responsive to the format flag, wherein the encoded picture data is decoded responsive to the second coefficient flag.

14. A picture decoding apparatus for decoding a picture on a block basis in which encoded picture data obtained by having reference to coefficients of a neighboring block to effect predictive coding before encoding coefficients specifying the state of a picture by discrete cosine transform executed on a block basis is decoded, each of said blocks being made up of a luminance block and a chrominance block, comprising:

decoding means for decoding the encoded picture data as the position and number of blocks used for prediction of AC coefficients and DC coefficients by said discrete cosine transform is set responsive to a format flag indicating a picture format adapted for setting the type and the number of chrominance pixels allocated to the luminance pixels constituting said luminance block.

15. A furnishing medium for furnishing encoded picture data encoded on a block basis constituted by a luminance block and a chrominance block, wherein the encoded picture data furnished has been generated by:
   adding a format flag to said picture for indicating a picture format of said picture;
   adding a first coefficient flag to said picture for indicating whether or not there exist one or more coefficients to be encoded in each said chrominance block;
   selectively adding a second coefficient flag to said picture for indicating in detail whether or not there exist one or more coefficients to be encoded in said chrominance block depending on said format flag and said first coefficient flag, where the second coefficient flag is not added if the first coefficient flag indicates no coefficients exist in each said chrominance block and the value of the second coefficient flag depends on the values of the format flag and the first coefficient flag.

16. A furnishing medium for furnishing encoded picture data obtained by having reference to coefficients of a neighboring block to effect predictive coding before encoding coefficients specifying the state of a picture by discrete cosine transform executed on a block basis, each of said blocks being made up of a luminance block and a chrominance block, wherein
   the encoded picture data is furnished as the position and number of blocks used for prediction of AC coefficients and DC coefficients by said discrete cosine transform is set responsive to a format flag indicating a picture format adapted for setting the type and the number of chrominance pixels allocated to the luminance pixels constituting said luminance block.

* * * * *